United States Patent
Wardle

(10) Patent No.: US 11,881,320 B2
(45) Date of Patent: Jan. 23, 2024

(54) MOLTEN FUEL REACTORS AND ORIFICE RING PLATES FOR MOLTEN FUEL REACTORS

(71) Applicant: TerraPower, LLC, Bellevue, WA (US)

(72) Inventor: Kent E. Wardle, Kirkland, WA (US)

(73) Assignee: TerraPower, LLC, Bellevue, WA (US)

( * ) Notice: Subject to any disclaimer, the term of this patent is extended or adjusted under 35 U.S.C. 154(b) by 123 days.

(21) Appl. No.: 17/130,123

(22) Filed: Dec. 22, 2020

(65) Prior Publication Data

US 2021/0272707 A1  Sep. 2, 2021

Related U.S. Application Data

(60) Provisional application No. 62/981,374, filed on Feb. 25, 2020, provisional application No. 62/953,065, filed on Dec. 23, 2019.

(51) Int. Cl.
G21C 1/22 (2006.01)
G21C 15/24 (2006.01)
G21C 15/02 (2006.01)

(52) U.S. Cl.
CPC ............. *G21C 1/22* (2013.01); *G21C 15/24* (2013.01); *G21C 15/02* (2013.01)

(58) Field of Classification Search
CPC ............ G21C 1/22; G21C 1/14; G21C 15/00
See application file for complete search history.

(56) References Cited

U.S. PATENT DOCUMENTS

| | | |
|---|---|---|
| 2,375,009 A | 5/1945 | Lepsoe et al. |
| 2,874,106 A | 2/1959 | Hammond et al. |
| 2,920,024 A | 1/1960 | Barton et al. |
| 2,945,794 A | 7/1960 | Winters et al. |
| 3,010,889 A | 11/1961 | Fortescue et al. |

(Continued)

FOREIGN PATENT DOCUMENTS

| | | |
|---|---|---|
| CA | 631890 | 11/1961 |
| CN | 1150310 A | 5/1997 |

(Continued)

OTHER PUBLICATIONS

PCT/US2020/066908 Search report and written opinion, dated Aug. 16, 2021, 22 pages.

(Continued)

*Primary Examiner* — Lily C Garner

(74) *Attorney, Agent, or Firm* — Merchant & Gould P.C.

(57) ABSTRACT

A molten fuel reactor includes a reactor core having substantially a right-circular cylinder shape with a longitudinal axis. At least one inlet is configured to channel fuel salt into the reactor core. At least one outlet is configured to channel fuel salt out of the reactor core, and the inlet and outlet at least partially define a flow loop of fuel salt with respect to the reactor core. An orifice ring plate is disposed within the reactor core and proximate the at least one inlet. The orifice ring plate is configured to condition a flow of fuel salt entering the reactor core from the at least one inlet. The orifice ring plate extends circumferentially about the longitudinal axis and has a height defined in a direction along the longitudinal axis. The orifice ring plate includes a plurality of apertures configured to allow the flow of fuel salt therethrough.

17 Claims, 8 Drawing Sheets

(56) References Cited

U.S. PATENT DOCUMENTS

| | | | |
|---|---|---|---|
| 3,018,239 A | 1/1962 | Happell et al. |
| 3,029,130 A | 4/1962 | Moore |
| 3,046,212 A | 7/1962 | Anderson |
| 3,136,700 A | 6/1964 | Poppendiek et al. |
| 3,178,356 A | 4/1965 | Wheelock |
| 3,216,901 A | 11/1965 | Teitel |
| 3,218,160 A | 11/1965 | Knighton et al. |
| 3,262,856 A | 7/1966 | Bettis |
| 3,275,422 A | 9/1966 | Cathers et al. |
| 3,287,225 A | 11/1966 | Ackroyd et al. |
| 3,368,945 A | 2/1968 | Keller et al. |
| 3,383,285 A | 5/1968 | Ackroyd et al. |
| 3,450,198 A | 6/1969 | Brunner |
| 3,743,577 A * | 7/1973 | Perry ................ G21C 3/54 |
| | | | 976/DIG. 30 |
| 3,785,924 A | 1/1974 | Notari |
| 3,909,351 A | 9/1975 | Tilliette |
| 3,996,099 A | 12/1976 | Faugeras et al. |
| 3,997,413 A | 12/1976 | Fougner |
| 4,039,377 A | 8/1977 | Andrieu et al. |
| 4,045,286 A | 8/1977 | Blum et al. |
| 4,056,435 A | 11/1977 | Carlier et al. |
| 4,216,821 A | 8/1980 | Robin |
| 4,284,473 A | 8/1981 | Kasama |
| 4,309,252 A | 1/1982 | Gilroy |
| 4,342,721 A | 8/1982 | Pomie |
| 4,397,778 A | 8/1983 | Lloyd |
| 4,639,350 A | 1/1987 | Malaval |
| 4,762,667 A | 8/1988 | Sharbaugh |
| 4,786,464 A | 11/1988 | Bardot |
| 4,820,476 A | 4/1989 | Popalis |
| 5,185,120 A | 2/1993 | Fennern |
| 5,196,159 A | 3/1993 | Kawashima et al. |
| 5,223,210 A | 6/1993 | Hunsbedt et al. |
| 5,380,406 A | 1/1995 | Horton et al. |
| 5,421,855 A | 6/1995 | Hayden et al. |
| 5,596,611 A | 1/1997 | Ball |
| 5,730,874 A | 3/1998 | Wai et al. |
| 5,770,085 A | 6/1998 | Wai et al. |
| 5,792,357 A | 8/1998 | Wai et al. |
| 5,910,971 A | 6/1999 | Ponomarev-Stepnoy et al. |
| 6,181,759 B1 | 1/2001 | Heibel |
| 7,217,402 B1 | 5/2007 | Miller et al. |
| 8,132,410 B2 | 3/2012 | Oh et al. |
| 8,416,908 B2 | 4/2013 | Mann |
| 8,529,713 B2 | 9/2013 | Ahlfeld et al. |
| 8,594,268 B2 | 11/2013 | Shu |
| 8,734,738 B1 | 5/2014 | Herrmann |
| 9,171,646 B2 | 10/2015 | Moses et al. |
| 9,721,678 B2 | 8/2017 | Cheatham et al. |
| 10,043,594 B2 | 8/2018 | Scott |
| 10,141,079 B2 | 11/2018 | Czerwinski et al. |
| 10,438,705 B2 | 10/2019 | Cheatham |
| 10,497,479 B2 | 12/2019 | Abbott et al. |
| 10,734,122 B2 | 8/2020 | Cisneros et al. |
| 10,867,710 B2 | 12/2020 | Cisneros et al. |
| 11,367,536 B2 | 6/2022 | Abbott et al. |
| 2004/0114703 A1 | 6/2004 | Bolton et al. |
| 2005/0220251 A1 | 10/2005 | Yokoyama et al. |
| 2008/0232533 A1 | 9/2008 | Blanovsky |
| 2008/0273650 A1 | 11/2008 | Yokoyama et al. |
| 2008/0310575 A1 | 12/2008 | Cinotti |
| 2009/0279658 A1 | 11/2009 | Leblanc |
| 2010/0226471 A1 | 9/2010 | Cinotti |
| 2011/0131991 A1 | 6/2011 | Oh et al. |
| 2011/0222642 A1 | 9/2011 | Gautier |
| 2011/0286563 A1 | 11/2011 | Moses et al. |
| 2011/0286565 A1 | 11/2011 | Tsang |
| 2011/0305309 A1 | 12/2011 | Brown |
| 2012/0027156 A1 | 2/2012 | Peterson |
| 2012/0051481 A1 | 3/2012 | Shu |
| 2012/0056125 A1 | 3/2012 | Raade et al. |
| 2012/0069946 A1 | 3/2012 | Hamill et al. |
| 2012/0183112 A1 | 7/2012 | Leblanc |
| 2012/0275558 A1 | 11/2012 | Cinotti |
| 2012/0288048 A1 | 11/2012 | Mann |
| 2012/0314829 A1 | 12/2012 | Greene |
| 2013/0083878 A1 | 4/2013 | Massie et al. |
| 2013/0180520 A1 | 7/2013 | Raade et al. |
| 2013/0272470 A1 | 10/2013 | Whitten et al. |
| 2014/0023172 A1 | 1/2014 | Leblanc |
| 2014/0166924 A1 | 6/2014 | Raade et al. |
| 2014/0348287 A1 | 11/2014 | Huke et al. |
| 2015/0010875 A1 | 1/2015 | Raade et al. |
| 2015/0036779 A1 | 2/2015 | LeBlanc |
| 2015/0078504 A1 | 3/2015 | Woolley |
| 2015/0117589 A1 | 4/2015 | Kamei |
| 2015/0170766 A1 | 6/2015 | Singh et al. |
| 2015/0228363 A1 | 8/2015 | Dewan et al. |
| 2015/0243376 A1 | 8/2015 | Wilson |
| 2015/0310943 A1* | 10/2015 | Kielb ................ G21C 15/02 |
| | | | 376/399 |
| 2015/0357056 A1 | 12/2015 | Shayer |
| 2016/0005497 A1 | 1/2016 | Scott |
| 2016/0189806 A1 | 6/2016 | Cheatham, III et al. |
| 2016/0189812 A1 | 6/2016 | Czerwinski et al. |
| 2016/0189813 A1 | 6/2016 | Cisneros et al. |
| 2016/0189816 A1 | 6/2016 | Czerwinski et al. |
| 2016/0196885 A1 | 7/2016 | Singh |
| 2016/0217874 A1 | 7/2016 | Dewan et al. |
| 2016/0260505 A1 | 9/2016 | Cadell et al. |
| 2016/0260509 A1 | 9/2016 | Kim et al. |
| 2016/0300628 A1 | 10/2016 | Fortino et al. |
| 2017/0084355 A1 | 3/2017 | Scott |
| 2017/0092381 A1 | 3/2017 | Cisneros et al. |
| 2017/0117065 A1 | 4/2017 | Scott |
| 2017/0213610 A1 | 7/2017 | Sumita et al. |
| 2017/0301413 A1 | 10/2017 | Cisneros et al. |
| 2017/0301418 A1 | 10/2017 | Dodson et al. |
| 2017/0301421 A1 | 10/2017 | Abbott et al. |
| 2017/0316840 A1* | 11/2017 | Abbott ................ G21C 1/326 |
| 2017/0316841 A1 | 11/2017 | Abbott et al. |
| 2018/0019025 A1 | 1/2018 | Abbott et al. |
| 2018/0047467 A1 | 2/2018 | Czerwinski et al. |
| 2018/0068750 A1 | 3/2018 | Cisneros et al. |
| 2018/0137944 A1* | 5/2018 | Abbott ................ G21C 15/26 |
| 2018/0277260 A1 | 9/2018 | Marcille et al. |
| 2019/0139665 A1 | 5/2019 | Czerwinski et al. |
| 2019/0172594 A1 | 6/2019 | Lyons et al. |
| 2019/0237205 A1 | 8/2019 | Abbott et al. |
| 2019/0311816 A1 | 10/2019 | Sumita et al. |
| 2020/0027590 A1 | 1/2020 | Cisneros et al. |
| 2020/0118698 A1 | 4/2020 | Cheatham et al. |
| 2020/0122109 A1 | 4/2020 | Kruizenga et al. |
| 2020/0185114 A1 | 6/2020 | Abbott et al. |
| 2020/0211724 A1 | 7/2020 | Cisneros et al. |
| 2020/0357531 A1 | 11/2020 | Inman et al. |
| 2021/0202117 A1 | 7/2021 | Nelson |
| 2022/0076854 A1 | 3/2022 | Ougouag et al. |

FOREIGN PATENT DOCUMENTS

| | | |
|---|---|---|
| CN | 1922695 | 2/2007 |
| CN | 101939793 | 1/2011 |
| CN | 104145309 | 11/2014 |
| CN | 105684090 A | 6/2016 |
| CN | 207489486 U * | 6/2018 |
| CN | 107112055 | 9/2020 |
| DE | 1112791 | 10/1963 |
| DE | 1439107 | 2/1969 |
| EP | 0617430 | 9/1994 |
| FR | 2296248 | 11/1977 |
| GB | 739968 | 11/1955 |
| GB | 835266 | 5/1960 |
| GB | 964841 | 7/1964 |
| GB | 2073938 B | 7/1984 |
| GB | 2511113 | 8/2014 |
| GB | 2508537 | 12/2014 |
| GB | 2516046 | 1/2015 |
| JP | 35013995 | 9/1960 |
| JP | 571991 | 1/1982 |
| JP | 1991282397 | 12/1991 |
| JP | 06174882 | 6/1994 |
| JP | 11174194 | 7/1999 |

(56) References Cited

FOREIGN PATENT DOCUMENTS

| | | |
|---|---|---|
| JP | 2001133572 | 5/2001 |
| JP | 2003063801 | 3/2003 |
| JP | 2010223942 | 10/2010 |
| JP | 2012047531 | 3/2012 |
| JP | 2014119429 | 12/2012 |
| JP | 2014534413 | 12/2014 |
| JP | 2015510588 | 4/2015 |
| RU | 57040 U1 | 9/2006 |
| RU | 2424587 | 7/2011 |
| WO | 200003399 | 1/2000 |
| WO | 2009135286 | 11/2009 |
| WO | 2013085383 | 6/2013 |
| WO | 2013116942 | 8/2013 |
| WO | 2013180029 | 12/2013 |
| WO | 2014039641 | 3/2014 |
| WO | 2014074930 | 5/2014 |
| WO | 2014128457 | 8/2014 |
| WO | 2014196338 | 12/2014 |
| WO | 2015140495 | 9/2015 |
| WO | 2016109565 | 7/2016 |
| WO | 2016197807 | 12/2016 |
| WO | 2018013317 | 1/2018 |
| WO | 2018/026429 A2 | 2/2018 |
| WO | 2021133952 | 7/2021 |

OTHER PUBLICATIONS

Rykhlevskii, Andrei, et al., Fuel Cycle Performance of Fast Spectrum Molten Salt Reactor Designs. Oak Ridge National Lab (ORNL), Oak Ridge, TN (United States), 2019. (Year: 2019), 13 pages.
Sabharwall, Piyush, et al., "Small Modular molten salt reactor (SM-MSR)," Small Modular Reactors Symposium. vol. 54730. 2011.
Abbott et al, Thermal and Mechanical Design Aspects of the LIFE Engine, Fusion Science and Technology Dec. 2008; 56(2).
Andreades et al., Technical Description of the Mark 1 Pebble-Bed Fluoride-Salt-Cooled High-Temperature Reactor (PB-FHR) Power Plant, Department of Nuclear Engineering, University of California, Berkeley (Sep. 30, 2014), 153 pages.
Ashraf-Khorassani, Mehdi, Michael T. Combs, and Larry T. Taylor. "Solubility of metal chelates and their extraction from an aqueous environment via supercritical $CO_2$." Talanta 44.5 (1997): 755-763.
ASTM International, Designation: B898-11, Standard Specification for Reactive and Relactory Metal Clad Plate (Sep. 2011), 15 pages.
Bertch, T.C., Selective Gaseous Extraction Research, Development and Training for Isotope Production, Final Technical Report for the Period Apr. 1, 2012 through Mar. 31, 2014, General Atomics, 27 pgs.
Borts, B., et al. "The study of supercritical extraction of complexes of molybdenum with carbon dioxide." 6 (6) (2016): 57-63.
Chapter 20, Creeping Flow, Physics of Continuous Matter, Exotic and Everyday Phenomena in the Macroscopic World, Lautrup, B., The Niels Bohr Institute, Copenhagen, Denmark, 2004.
Chou, Wei-Lung, et al., "Removal of gallium (iii) ions from acidic aqueous solution by supercritical carbon dioxide extraction in the green separation process." Journal of hazardous materials 160.1 (2008): 6-12.
Clarno, K.T. et al., "Trade studies for the liquid-salt-cooled very high-temperature reactor: fiscal year 2006 progress report", ORNL/TM-2006 140 (2007), 35 pgs.
Cohen et al., "Vanadium-Lined HT9 Cladding Tubes", Argonne National Lab ANL/ET/CP-80384, (Feb. 1994), 12 pgs.
Donnelly et al., Fabrication of Heat Exchanger Tube Bundle for the Molten-Salt Reactor Experiment, ORNL-3500, Dec. 9, 1963.
EESR EP15875826.8 European Extended Search Report in European Application EP15875826.8, dated Sep. 6, 2018, 7 pages.
EP15876187.4 European Extended Search Report for EP 15876187.4 dated Sep. 11, 2018, 10 pages.
Forsberg et al., Fluoride-Salt-Cooled High-Temperature Reactor (FHR) Commercial Basis and Commercialization Strategy, MIT Center for Advanced Nuclear Energy Systems, MIT-ANP-TR-153, Dec. 2014, 148 pgs.
Forsberg et al., Fluoride-Salt-Cooled High-Temperature Reactor (FHR) for Power and Process Heat, Final Project Report, MIT-ANP-TR-157, Dec. 2014, 62 pgs.
Forsberg et al., Fluoride-Salt-Cooled High-Temperature Reactor (FHR): Goals, Options, Ownership, Requirements, Design, Licensing, and Support Facilities, MIT Center for Advanced Nuclear Energy Systems, MIT-ANP-TR-154, Dec. 2014, 217 pgs.
Forsberg, Appendix D: Test Reactor Workshop Conclusions, NEUP Integrated Research Project Workshop 6: Fluoride Salt-Cooled High Temperature Reactor (FHR) Test Reactor Goals; Designs, and Strategies, Oct. 2-3, 2014, 11 pages.
Freeman et al., "Archimedes Plasma Mass Filter," AIP Conf. Proc. 694, 403 (2003).
Gen IV International Forum, Molten Salt Reactor (MSR), https://www.gen-4.org/gif/jcms/c_9359/msr, accessed Feb. 26, 2016, 3 pgs.
Grimes, W. R., "Molten-Salt Reactor Chemistry," Nucl. Appl. Technol. vol. 8, 137-155 (1970).
Harder, B.R., Long, G., and Stanaway, W.P., "Compatibility and Processing Problems in the Use of Molten Uranium Chloride-Alkali Chloride Mixtures as Reactor Fuels," Symposium on Reprocessing of Nuclear Fuels, Iowa State University, 405-432, 28 pages, Aug. 1969.
Holcomb, et al. Fast Spectrum Molten Salt Reactor Options, Jul. 2011, 46 pages. Available at: http://info.ornl.gov/sites/publications/files/Pub29596.pdf.
Hung, Laurence, et al. "Supercritical $CO_2$ extraction of molybdenum-ligand complexes from sulfuric solutions." The Journal of Supercritical Fluids 111 (2016): 97-103.
Kimura-Neutron Spectrum in Small Iron Pile Surrounded by Lead Reflector, Journal of Nuclear Science and Technology, 15(3), pp. 183-191 (Mar. 1978).
Kramer et al., Fusion-Fission Blanket Options for the LIFE Engine, Fusion Science and Technology, vol. 60, pp. 72-77, Jul. 2011.
Kramer et al., Parameter study of the LIFE engine nuclear design, Energy Conversion and Management, 51, pp. 1744-1750, 2010.
Kuznetsov et al., Electrochemical Behavior and Some Thermodynamic Properties of UCl [sub 4] and UCl [sub 3] Dissolved in a LiCl—KCl Eutectic Melt, Journal of the Electrochemical Society, vol. 152, No. 4, Jan. 2005, 11 pages.
Li, et al., "Affinity Extraction into $CO_2$. 2. Extraction of Heavy Metals into $C0_2$ from Low-pH Aqueous Solutions", Ind. Eng. Chem. Res. 37:4763-4773 (1998).
Lin et al., "Supercritical fluid extraction and chromatography of metal chelates and organometallic compounds" trends in analytical chemistry 14(3):123-133 (1995).
Maltsev et al., Redox potentials of uranium in molten eutectic mixture of lithium, potassium, and cesium chlorides, Russian Metallurgy, Maiknauka—Interperidica, RU, vol. 2016, No. 8, Dec. 2016.
Mekki et al., "Extraction of Lanthanides from Aqueous Solution by Using Room-Temperature Ionic Liquid and Supercritical Carbon Dioxide in Conjunction" Chem. Eur. J. 12:1760-1766 (2006).
Merle-Lucotte, E., Introduction to the Physics of the Molten Salt Fast Reactor, Thorium Energy Conference 2013 (ThEC13), 2013.
Molten Salt Reactor (MSR) Review: Feasibility Study of developing a pilot scale molten salt reactor in the UK, Jul. 2015, Energy Process Development, LTD (available at www.energyprocessdevelopments.com).
Mourogov et al., Potentialities of the fast spectrum molten salt reactor concept: REBUS-3700, Energy Conversion and Management, Mar. 30, 2006, vol. 47, No. 17, pp. 2761-2771.
MSR-FUJI General Information, Technical Features, and Operating Characteristics.
Ottewitte, E. H., "Configuration of a Molten Chloride Fast Reactor on a Thorium Fuel Cycle to Current Nuclear Fuel Cycle Concerns," Ph.D. dissertation, University of California at Los Angeles, 1982.
Ottewitte, E. H., Cursory First Look at the Molten Chloride Fast Reactor as an Alternative to the Conventional BATR Concept.
PCT/U S2020/066599 ISR+WO dated May 17, 2021, 17 pages.
PCT/US2015/000499 IPRP+WO—International Preliminary Report on Patentability and Written Opinion in International Application PCT/US2015/000499, dated Jul. 4, 2017, 9 pages.

(56) References Cited

OTHER PUBLICATIONS

PCT/US2015/000499 ISR+WO—International Search Report and Written Opinion in International Application PCT/US2015/000499, dated Jul. 22, 2016, 11 pages.
PCT/US2015/067704 IPRP+WO—International Preliminary Report on Patentability and Written Opinion dated Jul. 4, 2017, 7 pages.
PCT/US2015/067704 ISR+WO—International Search Report and Written Opinion.
PCT/US2015/067905 IPRP—International Preliminary Report on Patentability dated Jul. 4, 2017, 14 pages.
PCT/US2015/067905 ISR+WO—International Search Report and Written Opinion in International Application PCT/US2015/067905 dated Aug. 5, 2016, 18 pages.
PCT/US2015/067923 IPRP—International Preliminary Report on Patentability dated Jul. 4, 2017, 7 pages.
PCT/US2015/067923 ISR+WO—International Search Report and Written Opinion in International Application PCT/US2015/067923, dated Apr. 19, 2016.
PCT/US2016/055001 IPRP+WO—International Preliminary Report on Patentability and Written Opinion dated Apr. 12, 2018, 9 pages.
PCT/US2016/055001 ISR+WO—International Search Report and Written Opinion in International Application PCT/US2016/055001, dated Jan. 25, 2017, 11 pages.
PCT/US2017/030455 IPRP—International Preliminary Report on Patentability dated Nov. 6, 2018, 17 pages.
PCT/US2017/030455 ISR+WO—International Search Report and Written Opinion dated Jan. 30, 2018, 23 pages.
PCT/US2017/030457 IPRP—International Preliminary Report on Patentability dated Nov. 15, 2018, 15 pages.
PCT/US2017/030457 ISR+WO—International Search Report and Written Opinion in International Application PCT/US2017/030457, dated Jan. 23, 2018, 20 pages.
PCT/US2017/030666 ISR+WO, dated Jul. 20, 2017.
PCT/US2017/030666 PCT International Preliminary Report on Patentability in International Application PCT/JS2017/030666 dated Nov. 6, 2018, 9 pages.
PCT/US2017/030672 IPRP+WO—International Preliminary Report on Patentability and Written Opinion dated Nov. 6, 2018, 7 pages.
PCT/US2017/030672 ISR+WO—International Search Report and Written Opinion in International Application No. PCT/US2017/030672, dated Sep. 27, 2017, 9 pages.
PCT/US2017/038806 IPRP+WO—International Preliminary Report on Patentability and Written Opinion in International Application PCT/US2017/038806, dated Jan. 15, 2019, 7 pgs.
PCT/US2017/038806 ISR+WO—International Search Report and Written Opinion dated Oct. 16, 2017.
PCT/US2017/046139 IPRP+WO—International Preliminary Report on Patentability and Written Opinion dated Feb. 12, 2019, 8 pgs.
PCT/US2017/046139 ISR+WO—International Search Report and Written Opinion, dated Jan. 17, 2018, 16 pgs.
PCT/US2017/061843 IPRP+WO—International Preliminary Report on Patentability and Written Opinion in International Application PCT/US2017/061843, dated May 21, 2019, 13 pages.
PCT/US2017/061843 ISR+WO—International Search Report and Written Opinion in International Application PCT/US2017/061843, dated Oct. 29, 2018, 23 pages.
PCT/US2019/015967 IPRP—International Preliminary Report on Patentability (IPRP) dated Aug. 13, 2020.
PCT/US2019/015967 ISR+WO—International Search Report and Written Opinion of PCT/US2019/015967, dated Jun. 12, 2019, 25 pages.
PCT/US2019/021791 IPRP—PCT International Preliminary Report on Patentability in International Application PCT/US2019/021791, dated Sep. 24, 2020, 9 pages.
PCT/US2019/021791 ISR+WO—International Search Report and Written Opinion in International Application PCT/US2019/021791, dated Nov. 19, 2019, 15 pages.
PCT/US2019/051345 ISR+WO—International Search Report and Written Opinion in International Application PCT/US2019/051345, dated Mar. 5, 2020, 15 pages.

Reactor Start-up Procedure. Technical University Dresden. Reactor Training Course. pp. 3-4. <https://tu-dresden.de/ing/maschinenwesen/iet/wket/ressourcen/dateien/akr2/Lehrmaterialien/start_e.pdf?lang=en>. (Mar. 2015), 21 pgs.
Reactor Training Court Experiment Reactor Start-up Procedure, Technical University Dresden, Institute of Power Engineering Training Reactor.
Scott, Ian and Durham John, the Simple Molten Salt Reactor, Practical, safe and cheap, Moltex Energy LLP presentation slides, 19 pgs.
Scott, Ian: Safer, cheaper nuclear: The simple molten salt reactor, http://www.ee.co.za/article/safer-cheaper-nuclear-simple-molten-salt-reactor.html, Dec. 2, 2014, 10 pgs.
Takata et al., Conceptual Design on Fast Reactor Fuel Reprocessing System Using Super-Direx Process, pp. 5 (Apr. 25-29, 2004).
Taube, et al., Molten Plutonium Chlorides Fast Breeder Reactor Cooled by Molten Uranium Chloride, Annals of Nuclear Science and Engineering, vol. 1, pp. 277-281., 1974.
Thoma, R. E., "Chemical Aspects of MSRE Operations," ORNL-4658, Dec. 1971.
TRANSATOMIC Power Technical White Paper, Mar. 2014, V1 .0.1., (2014), http://www.transatomicpower.com/, 34 pgs.
Van't Eind, R.J.S., Simulation of a Fast Molten Salt Reactor, PSR-131-2011-009, Jul. 2011, 68 pages.
Wai, C. M. "Supercritical Fluid Extraction of Trace Metals from Solid and Liquid Materials for Analytical Application." Analytical sciences 11.1 (1995): 165-167.
Wai, C.M. and Shaofen Wang. "Supercritical fluid extraction: metals as complexes." Journal of chromatography A 785. 1-2 (1997): 369-383.
Wang et al., "Extraction of Uranium from Aqueous Solutions by Using Ionic Liquid and Supercritical Carbon Dioxide in Conjunction" Chem. Eur. J. 15:4458-4463 (2009).
Wang Shaofen et al., "Application of Supercritical Fluid Extraction Technology on the Treatment of Nuclear Waste", Applied Chemistry, vol. 20, No. 5, pp. 409-414, May 31, 2003.
Wang, Jun-Wei et al.: "Influence of MgC12 content on corrosion behavior of GH1140 in molten NaCl—MgCl2as thermal storage medium", Solar Energy Materials and Solar Cells, Elsevier Science Publishers, Amsterdam, NL, vol. 179, Nov. 20, 2017, pp. 194-201, ISSN: 0927-0248.
Xu et al., Thorium Energy R&D in China, THEO13, CERN, Oct. 28, 2013, 59 pgs.
Zhao et al., Review Use of ionic liquids as 'green' solvents for extractions, J. Chem. technol. Biotechnol. 80: 1089-1096 (2005), pp. 1089-1096 (2005).
Zhu et al., "Extraction of Actinides and Lanthanides by Supercritical Fluid" Journal of Engineering for Gas Turbines and Power 133:1-8 (May 2011).
Rouch et al., Preliminary thermal-hydraulic core design of the Molten Salt Fast Reactor (MSFR), Annals of Nuclear Energy 64 (2014) 449-456.
Yamaji et al., Experimental and numerical thermal-hydraulics investigation of a molten salt reactor concept core, KERNTECHNIK 82 (2017) 4.
Yamaji et al., Experimental investigation of the MSFR molten salt reactor concept, KERNTECHNIK 79 (2014) 5, pp. 408-416.
Yamaji et al., Experimental Modelling and Numerical Analysis of a Molten Salt Fast Reactor, PHYSOR 2014—The Role of Reactor Physics Toward a Sustainable Future, Kyoto, Japan, Sep. 28-Oct. 2, 2014.
Yamaji et al., Thermal-hydraulic analyses and experimental modelling of MSFR, Annals of Nuclear Energy 64 (2014) 457-471.
Andreades, Design Summary of the Mark-I Pebble-Bed, Fluoride Salt-Cooled, High-Temperature Reactor Commercial Power Plant, Nuclear Technology, vol. 195(3), 223-238, Sep. 2016, 17 pages.
Gehin, Jess C., and Jeffrey J. Powers. "Liquid Fuel Molten Salt Reactors for Thorium Utilization." Nuclear Technology 194.2 (2016); 152-161 (Year: 2016), 11 pages.
ORNL-2474 (Oak Ridge National Laboratory), Molten-Salt Reactor Program Quarterly Progress Report for Period Ending Jan. 31, 1958, H.G. MacPherson, Program Director, Date Issued May 1, 1958, pp. 41-44, 11 p. .

(56) References Cited

OTHER PUBLICATIONS

Patent Search Report, Eurasian Patent Office, Eurasian application No. 202193104, dated May 19, 2022, 2 pages.
Renault, Claude et al. "The Molten Salt Reactor (MSR) R&D Status and Perspectives in Europe." (2010) (Year: 2010), 16 pages.

* cited by examiner

MOLTEN FUEL REACTORS AND ORIFICE RING PLATES FOR MOLTEN FUEL REACTORS

INTRODUCTION

This application claims priority to and the benefit of U.S. Provisional Application No. 62/981,374, filed Feb. 25, 2020, and U.S. Provisional Application No. 62/953,065, filed Dec. 23, 2019, which are hereby incorporated by reference herein in their entireties.

INTRODUCTION

The utilization of molten fuels in a nuclear reactor to produce power provides significant advantages as compared to solid fuels. For instance, molten fuel reactors generally provide higher average core power densities compared to solid fuel reactors, while at the same time having reduced fuel costs due to the relatively high cost of solid fuel fabrication.

Molten fluoride fuel salts suitable for use in nuclear reactors have been developed using uranium tetrafluoride ($UF_4$) mixed with other fluoride salts as well as using fluoride salts of thorium. Molten fluoride salt reactors have been operated at average temperatures between 600° C. and 860° C. Binary, ternary, and quaternary chloride fuel salts of uranium, as well as other fissionable elements, have been described in co-assigned U.S. patent application Ser. No. 14/981,512, titled MOLTEN NUCLEAR FUEL SALTS AND RELATED SYSTEMS AND METHODS, which application is hereby incorporated herein by reference. In addition to chloride fuel salts containing one or more of $UCl_4$, $UCl_3F$, $UCl_3$, $UCl_2F_2$, and $UClF_3$, the application further discloses fuel salts with modified amounts of $^{37}Cl$, bromide fuel salts such as $UBr_3$ or $UBr_4$, thorium chloride fuel salts, and methods and systems for using the fuel salts in a molten fuel reactor. Average operating temperatures of chloride salt reactors are anticipated between 300° C. and 800° C., but could be even higher, e.g., >1000° C.

Molten Fuel Reactors and Orifice Ring Plates for Molten Fuel Reactors

Molten fuel reactors and orifice ring plates for molten fuel reactors are described herein. The orifice ring plate is disposed within a low power region of a reactor core and proximate inlet channels that channel fuel salt into the reactor core. The orifice ring plate is oriented substantially orthogonal to the flow of fuel salt and is configured to balance and distribute the flow of fuel salt that enters into an active core region. By conditioning fuel salt flow within the reactor core, stability of the fuel salt flow is increased, which increases temperature uniformity and performance of the reactor. The orifice ring plate is coaxial with the right-circular cylinder shaped reactor core and is configured to direct fuel salt along the sides of the reactor core, direct fuel salt through the plate to provide flow distribution in the azimuthal direction, and allow fuel salt to flow below the plate to reduce or prevent centerline recirculation in the reactor core.

These and various other features as well as advantages which characterize the molten fuel reactors and orifice ring plates described herein will be apparent from a reading of the following detailed description and a review of the associated drawings. Additional features are set forth in the description which follows, and in part will be apparent from the description, or may be learned by practice of the technology. The benefits and features of the technology will be realized and attained by the structure in the written description and claims hereof, as well as the appended drawings.

It is to be understood that both the foregoing introduction and the following detailed description are exemplary and explanatory and are intended to provide further explanation of the invention as claimed.

BRIEF DESCRIPTION OF THE DRAWINGS

The following drawing figures, which form a part of this application, are illustrative of described technology and are not meant to limit the scope of the technology as claimed in any manner, which scope shall be based on the claims appended hereto.

DETAILED DESCRIPTION

Figure 1:
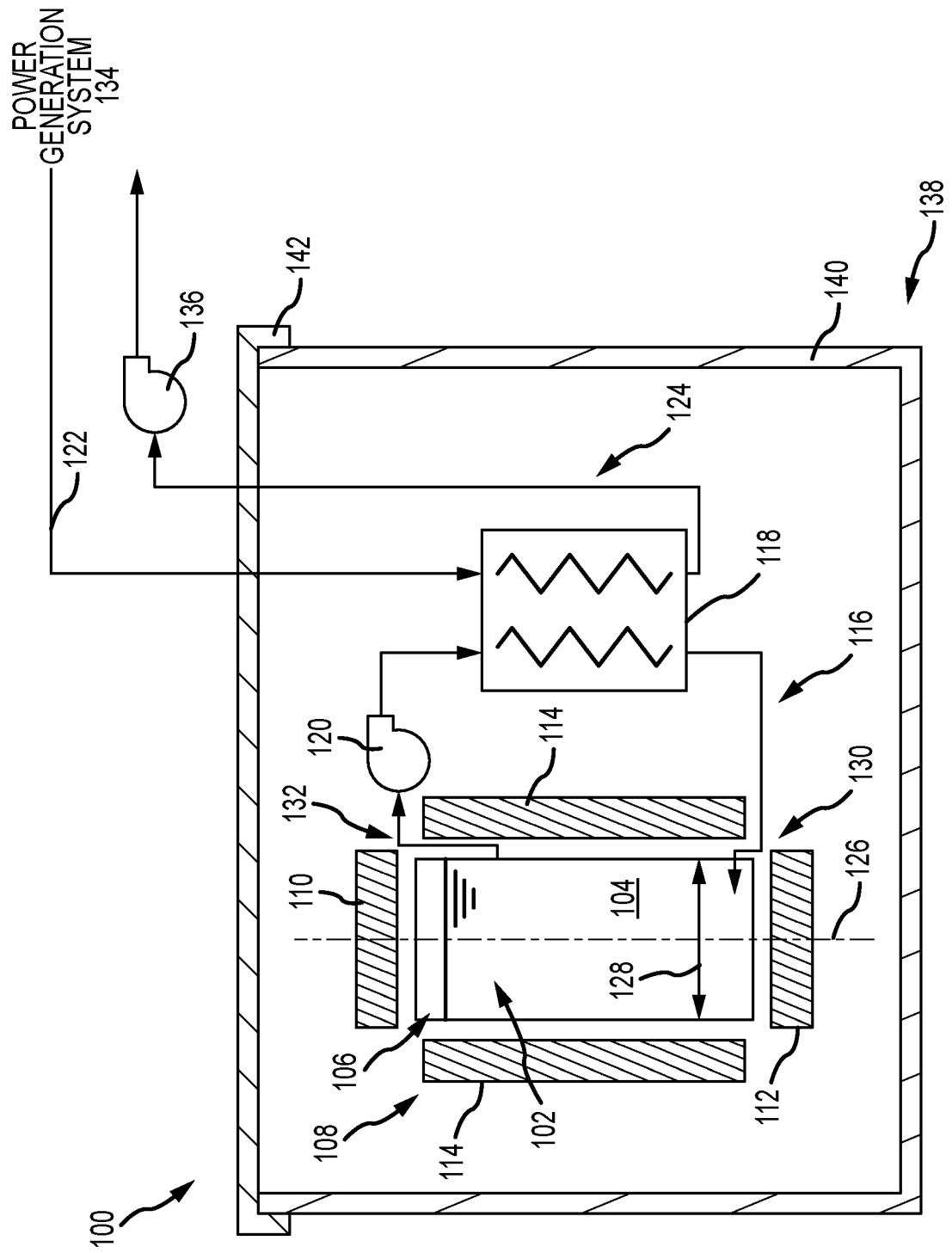
FIG. 1 illustrates, in block diagram form, some of the basic components of a molten fuel reactor.

This disclosure describes molten fuel reactors and orifice ring plates for molten fuel reactors. The orifice ring plate is disposed within a low power region of a reactor core and proximate inlet channels that channel fuel salt into the reactor core. The orifice ring plate is oriented substantially orthogonal to the flow of fuel salt and is configured to balance and distribute the flow of fuel salt that enters into an active core region. By conditioning fuel salt flow within the reactor core, stability of the fuel salt flow is increased, which increases temperature uniformity and performance of the reactor.

In aspects, the orifice ring plate is coaxial with the right-circular cylinder shaped reactor core. The orifice ring plate has a top solid portion that acts a deflector vane to direct fuel salt along side reflectors that define the reactor core and to reduce or prevent reflector recirculation. One or more apertures are formed within the plate that allow fuel salt to flow through the plate and provide flow distribution in the azimuthal direction within the reactor core. Additionally, the plate is configured to allow fuel salt to flow below the plate to reduce or prevent centerline recirculation in the reactor core and support fuel salt drainage from the inlet channel. In aspects, a height of the orifice ring plate is approximately equal to a height of the inlet channel. However, an inside lower corner of the side reflectors that form a boundary between the inlet channel and the reactor core is curved so that fuel salt can flow above the orifice ring plate. In aspects, a radius of the curved corner is about one-third of the height of the inlet channel. Furthermore, the orifice ring plate is spaced from the inlet channel so that fuel salt flow between multiple inlet channels can be balanced upstream of the plate.

As used herein, the terms "axial" and "longitudinal" refer to directions and orientations, which extend substantially parallel to a centerline of the reactor core and the orifice ring plate. Moreover, the terms "radial" and "radially" refer to directions and orientations, which extend substantially perpendicular to the centerline of the reactor core and the orifice ring plate. In addition, as used herein, the term "circumferential" and "circumferentially" refer to directions and orientations, which extend arcuately about the centerline of the reactor core and the orifice ring plate.

This disclosure describes various configurations and components of a molten fuel nuclear reactor. For the purposes of this application, examples of a molten fuel reactor that use a chloride fuel will be described. However, it will be understood that any type of fuel salt, now known or later developed, may be used and that the technologies described herein may be equally applicable regardless of the type of fuel used, such as, for example, salts having one or more of U, Pu, Th, or any other actinide. Note that the minimum and maximum operational temperatures of fuel within a reactor may vary depending on the fuel salt used in order to maintain the salt within the liquid phase throughout the reactor. Minimum temperatures may be as low as 300-350° C. and maximum temperatures may be as high as 1400° C. or higher.

FIG. 1 illustrates, in a block diagram form, some of the basic components of a molten fuel reactor 100. In general, the molten fuel reactor 100 includes a reactor core 102 containing a fissionable fuel salt 104 that is liquid at the operating temperature. Fissionable fuel salts include salts of any nuclide capable of undergoing fission when exposed to low-energy thermal neutrons or high-energy neutrons. Furthermore, for the purposes of this disclosure, fissionable material includes any fissile material, any fertile material or combination of fissile and fertile materials. The fuel salt 104 may or may not completely fill the core 102, and the example shown is illustrated with an optional headspace 106 above the level of the fuel salt 104 in the core 102. The size of the reactor core 102 may be selected based on the characteristics and type of the particular fuel salt 104 being used in order to achieve and maintain the fuel in an ongoing state of criticality, during which the heat generated by the ongoing production of neutrons in the fuel causes the temperature of the molten fuel to rise when it is in the reactor core 102. The performance of the reactor 100 is improved by providing one or more reflectors 108 around the core 102 to reflect neutrons back into the core. As illustrated, the reactor 100 may include an upper reflector 110, a lower reflector 112, and at least one radial side reflector 114. Additionally, the reflectors 108 may shield components positioned radially outward from the core 102. The molten fuel salt 104 is circulated in a fuel loop 116 between the reactor core 102 and one or more primary heat exchangers 118 located outside of the core 102. The circulation may be performed using one or more pumps 120.

The primary heat exchangers 118 transfer heat from the molten fuel salt 104 to a primary coolant 122 that is circulated through a primary coolant loop 124. In an example, the primary coolant may be another salt, such as $NaCl$—$MgCl_2$, lead, or other liquid metal. Other coolants are also possible including Na, NaK, Na mixtures, supercritical $CO_2$, liquid lead, and lead bismuth eutectic. In the example, the radial side reflector 114 extends between the upper reflector 110 and the lower reflector 112 and is positioned between each primary heat exchanger 118 and the reactor core 102 as shown in FIG. 1. In an aspect, the reactor core 102 has substantially a right-circular cylinder shape with a diameter of 2 meters (m) and a height of 3 m or greater, and is oriented vertically along a longitudinal axis 126 so that the flat ends of the cylinder are on the top and bottom, and adjacent the upper reflector 110 and the lower reflector 112, respectively. The radial side reflectors 114 are substantially parallel to the longitudinal axis 126 and at least partially define an inner diameter 128 of the reactor core 102.

The entire reactor core 102 is surrounded by reflectors 108 between which are provided radial channels for a flow of fuel salt 104 into (e.g., inlet channels 130) and out (e.g., outlet channels 132) of the reactor core 102. In an aspect, eight side reflectors 114 and primary heat exchangers 118 are circumferentially spaced around the reactor core 102 and about the longitudinal axis 126, with each primary heat exchanger 118 provided with the pump 120 to drive circulation of the fuel salt 104 and generate the fuel loop 116. In alternative examples, a different number of side reflectors 114 and primary heat exchangers 118 may be used as required or desired. For example, examples having 2, 3, 4, 5, 6, 8, 12, and 16 reflectors and primary heat exchangers are contemplated. Additionally, in some examples, circulation of the fuel salt 104 may be naturally driven (e.g., fuel circulation via the density differential created by the temperature differences within the fuel loop). This configuration can obviate the need for fuel salt pumps 120. Furthermore, it should be appreciated that while the inlet channel 130 is shown adjacent the lower reflector 112 in FIG. 1, the fuel loop 116 can be reversed and the inlet channel 130 can be adjacent the upper reflector 110 as required or desired.

In the embodiment shown in FIG. 1, in normal (power generating) operation, the fuel salt 104 is pumped from the reactor core 102, through the primary heat exchanger 118, and cooled fuel salt 104 is returned back to reactor core 102. Heated primary coolant 122 from the primary heat exchangers 118 is passed to a power generation system 134 for the generation of some form of power, e.g., thermal, electrical or mechanical. The reactor core 102, primary heat exchangers 118, pumps 120, molten fuel circulation piping (including other ancillary components that are not shown such as check valves, shutoff valves, flanges, drain tanks, etc.) and any other components through which the molten fuel circulates or contacts during operation can be referred to as the fuel loop 116. Likewise, the primary coolant loop 124 includes those components through which primary coolant circulates, including the primary heat exchangers 118, primary coolant circulation piping (including other ancillary components that are not shown such as coolant pumps 136, check valves, shutoff valves, isolation valves, flanges, drain tanks, etc.).

Salt-facing elements of the molten fuel reactor may be formed and/or clad to protect against corrosion. Other protection options include protective coatings, loose fitting liners, or press-fit liners. Based on the operating conditions, which will at least in part be dictated by the fuel selection, any suitable high temperature and corrosion resistant steel, such as, but not limited to, 316 stainless, HT-9, a molybdenum alloy, a zirconium alloy (e.g., ZIRCALOY™), SiC, graphite, a niobium alloy, nickel or alloy thereof (e.g., HASTELLOY™), or high temperature ferritic, martensitic, stainless steel, or the like, may be used.

The molten fuel reactor 100 further includes at least one containment vessel 138 that contains the fuel loop 116 to prevent a release of molten fuel salt 104 in case there is a leak from one of the fuel loop components. The containment vessel 138 is often made of two components: a lower, vessel portion 140 that takes the form of a unitary, open-topped vessel with no penetrations of any kind; and an upper, cap portion 142 referred to as the vessel head that covers the top of the vessel portion 140. All points of access to the reactor 100 are from the top through the vessel head 142.

Broadly speaking, this disclosure describes multiple alterations and component configurations that improve the performance of the reactor 100 described with reference to FIG. 1. For example, when the flow of fuel salt 104 within the fuel loop 116 enters the reactor core 102 from the inlet channel 130, the flow turns sharply (e.g., approximately 90°) to flow in an upward direction through the core 102. This change of direction of the flow of fuel salt 104 and the relative cross-section of the incoming channels as compared to the diameter of the core region can induce formation of jet-like flow recirculation vortexes and flow behavior that reduces performance of the molten fuel reactor 100. These recirculation vortexes result in relatively stationary flow within the middle of the vortex that heats up, and via buoyancy, the fuel salt can move through the reactor core and induce unstable flow and possibly reactivity instabilities within the fuel loop 116. With respect to reactor core's that have a right-circular cylinder shape and high flow rates, these vortexes can be formed along an inside wall of the side reflector 114 and proximate the lower corner with the inlet channel 130.

In some known reactor configurations, the shape and size of the reactor core and the inlet channel has been modified to reduce the sharp corners in the fuel loop. For example, the reactor core can take on a more hourglass shape with a modified inlet channel. These reactor cores, however, increase the volume of the reactor core, which then requires more fuel salt. In other known reactor configuration, a horizontal plate (e.g. in relation to the longitudinal axis) is positioned across the reactor core. This plate, however, is positioned close to the active core and absorbs a large amount of neutrons, and thereby also increases the amount of fuel salt required. Accordingly, a flow conditioner as described further below is disposed within the reactor core 102 and proximate the inlet channels 130 within a low power region of the core. The flow conditioner ensures the fuel salt flows entering the active core are well-distributed, without jet-like behavior or major recirculations, as the flow turns the corner inside the lower edge of the reflector 108. In the examples described herein, the flow conditioner is an orifice ring plate designed to optimize the flow, and thus, the heat distribution of the fuel salt 104 as it flows through the core. In additional or alternative examples, the flow conditioner may take an alternative form such as directional baffles, tube bundles, honeycombs, porous materials, and the like. The flow conditioner also reduces the impact of reactor geometry so that the volume of fuel salt needed for operation is not increased.

It should be appreciated that the molten fuel reactor 100 described in FIG. 1 can take many different forms. For example, the reactor 100 can be a molten chloride fast reactor that is used to generate power as described above. In other examples, the reactor 100 can be a reactor that does not generate power and that only generates heat. This reactor can be utilized to study the fuel salt 104 as required or desired.

Figure 2:
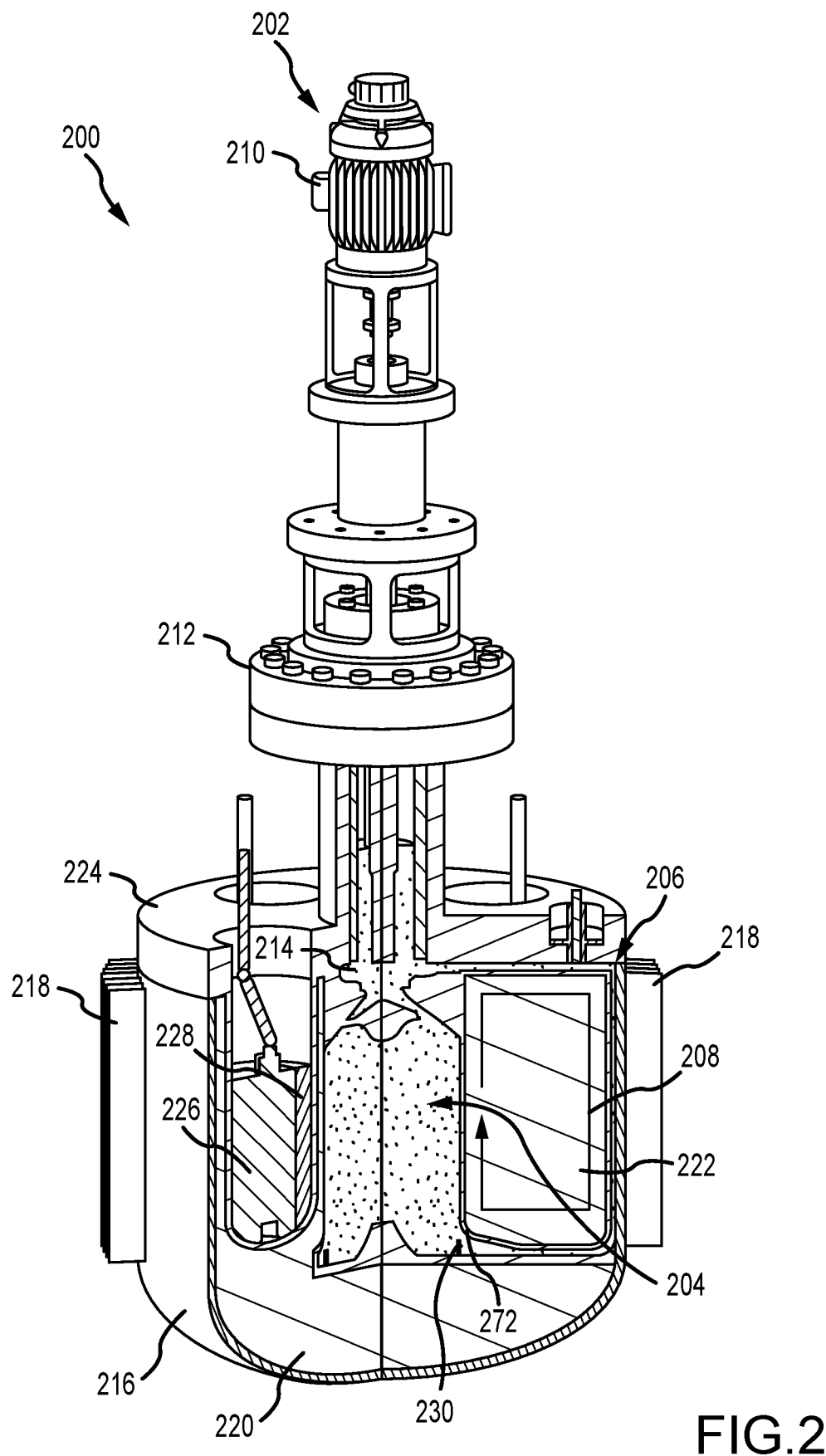
FIG. 2 is a perspective sectional view of one possible physical implementation of a reactor core system.

FIG. 2 is a perspective sectional view of one possible physical implementation of a reactor core system 200. In this example, the reactor core system 200 includes a single molten salt pump assembly 202 to circulate fuel salt through a central active core 204 and into four individual flow channels 206 that define a flow loop 208 of fuel salt. The flow loop 208 is described in further detail in FIG. 3 below. The pump assembly 202 includes a pump motor 210, a pump flange 212, and a pump impeller 214. Rotation of the impeller 214 drives the flow of fuel salt upward through the core 204 and downward within the flow channels 206 and along an interior surface of a reactor vessel 216. In alternative examples, the flow direction may be reversed as required or desired. The reactor vessel 216 can include fins 218 on the exterior surface to assist in transferring heat from the reactor vessel 216. As such, in this example a primary coolant loop is not provided and power is not generated from the reactor core system 200.

Within the reactor vessel 216 one or more reflectors surround the active core 204. In this example, a lower reflector 220 is disposed on the bottom side of the core 204 and one or more side reflectors 222 surround the lateral sides of the core 204. Additionally, a vessel head 224 acts as a reflector at the top side of the core 204. In other examples, an upper reflector may be disposed adjacent the vessel head 224. The reactor core system 200 also includes one or more independently rotated control drums 226. In this example, there are four control drums 226 that are cylinders of a reflector material with a partial face made of a neutron absorber 228. The side reflectors 222 define a receiving space for each control drum 226 so that the control drums 226 can be inserted into the reactor vessel 216 adjacent the active core 204. The control drums 226 can be independently rotated within the reflector 222 so that the neutron absorber 228 is closer to or farther away from the active core 204. This controls the amount of neutrons that are reflected back into the core 204, and thus, available for fission. When the absorber 228 is rotated to be in proximity to the core 204, neutrons are absorbed rather than reflected and the reactivity of the reactor is reduced. Through the rotation of the control drums 226, the reactor may be maintained in a state of criticality, subcriticality, or supercriticality, as required or desired.

Additionally, an orifice ring plate 230 is disposed within the active core 204 and proximate the inlet flow of fuel salt from the flow channels 206, adjacent the lower reflector 220. The orifice ring plate 230 is configured to condition the flow of fuel salt entering the active core 204 so as to reduce or eliminate fuel salt flow recirculation inside the lower active core region. The orifice ring plate 230 is described in further detail below.

Figure 3:
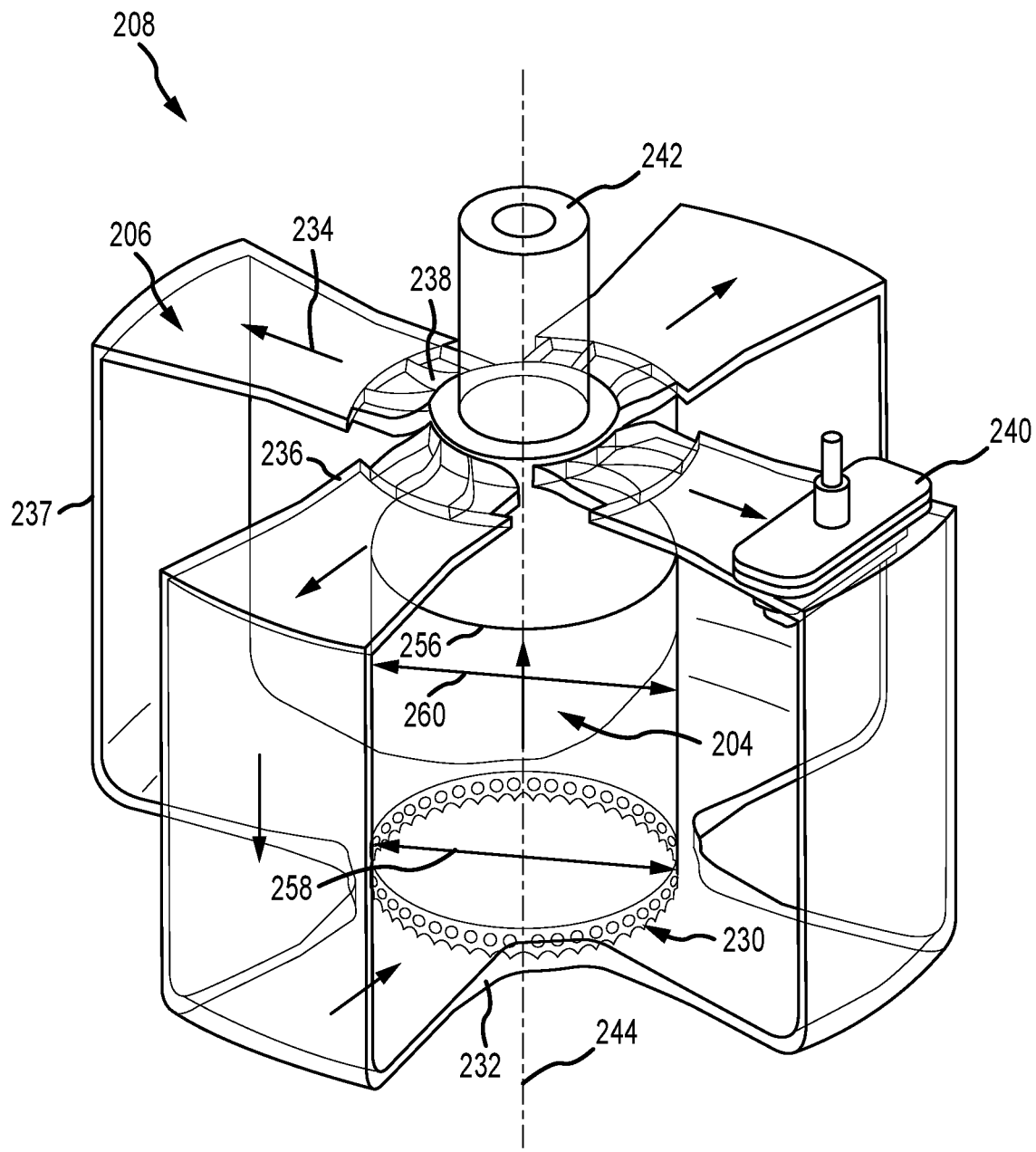
FIG. 3 is a perspective view of a fuel salt flow loop of the reactor core system shown in FIG. 2.
Figure 4:
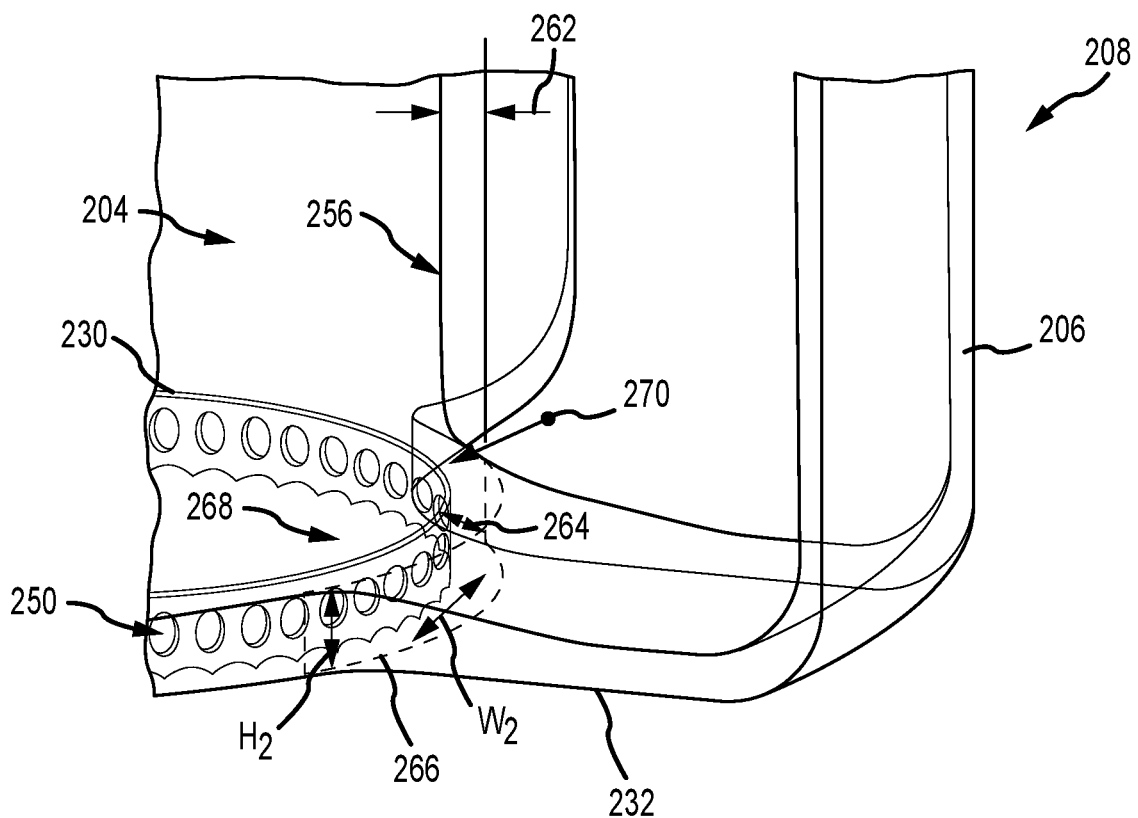
FIG. 4 is an enlarged partial perspective view of an exemplary orifice ring plate and an inlet channel of the fuel salt flow loop shown in FIG. 3.
Figure 5:
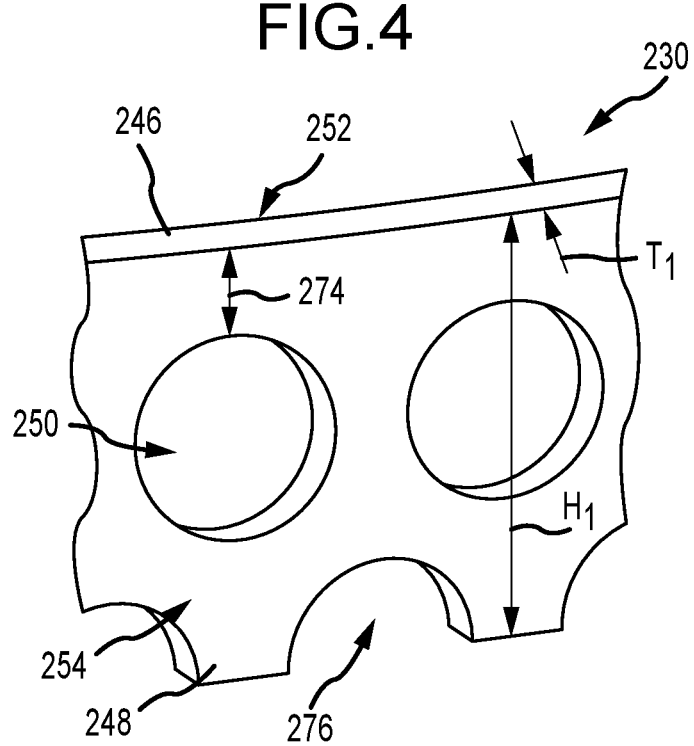
FIG. 5 is an enlarged partial perspective view of the orifice ring plate shown in FIG. 4.

FIG. 3 is a perspective view of the fuel salt flow loop 208 of the reactor core system 200 (shown in FIG. 2). FIG. 4 is an enlarged partial perspective view of the exemplary orifice ring plate 230 and an inlet channel 232 of the fuel salt flow loop 208. FIG. 5 is an enlarged partial perspective view of the orifice ring plate 230. Referring concurrently to FIGS. 3-5, the components of the reactor core system from FIG. 2 have been removed to detail the fuel salt flow loop 208 and the orifice ring plate 230. The flow loop 208 is full of fuel salt and the flow direction is illustrated by arrows 234. The flow loop 208 is defined by the active core 204, which is substantially a right-circular cylinder shape, and the flow channels 206 that are formed around the side reflectors 222 (shown in FIG. 2).

In this example, four flow channels 206 are circumferentially spaced around the active core 204, and include a radially extending inlet channel 232 configured to channel fuel salt into a lower portion of the active core 204 and a radially extending outlet channel 236 configured to channel fuel salt out of an upper portion of the active core 204. Each inlet channel 232 and outlet channel 236 are coupled in flow communication with an axial channel 237 that is substantially parallel to the active core 204, but separated from the core by one or more of the reflectors (not shown). As illustrated in FIG. 3, each of the four flow channels 206 are discrete and spaced apart from one another. It should be appreciated that any other number of discrete flow channels can be utilized as required or desired. In some examples, a portion (e.g., the inlet channel, the outlet channel, and/or the axial channel) of each of the flow channels 206 may be coupled in flow communication with each other so that the fuel salt flow can be balanced prior to entering the active core 204. Additionally, in an aspect, the fuel salt flow loop 208 may include a single flow channel that extends approximately 360° around the active core 204 so that the fuel salt flow can be balanced prior to entering the core. Upstream of the outlet channel 236 directing vanes 238 are provided so as to condition the fuel salt flow coming out of the pump assembly 202 (shown in FIG. 2).

In some examples, a flow restriction device 240 configured to control the flow of fuel salt may be located in one or more of the flow channels 206. As illustrated in FIG. 3, the flow restriction device 240 is located at the top of one of the four fuel salt flow channels 206 between the active core 204 and the reactor vessel. Although only one flow restriction device 240 is shown, in alternative examples, some of the other, or all of the other, flow channels 206 may be furnished with such devices. The flow restriction device 240 can include a valve, a gate valve, sluice gate, pinch valve, or the like, and allows the flow rate of the fuel salt to be reduced with the channel 206. Additionally, an expansion volume 242 is provided for the fuel salt at least partially within the pump assembly 202. The expansion volume 242 allows heated fuel salt to expand and enter the volume during reactor operation. The volume 242 can be filled with an inert gas and have a cover gas management system (not shown) to control the pressure of the gas within the expansion volume 242 and clean the gas as required or desired.

The orifice ring plate 230 is disposed within the active core 204 and proximate the inlet channels 232. The orifice ring plate 230 extends circumferentially about a longitudinal axis 244 of the active core 204 and includes a top end 246 and a bottom end 248. As contemplated herein, the orifice ring plate 230 can be circular or substantially circular, whereby the ring plate 230 is formed from a plurality of linear sections that when coupled together form a ring like shape. When the orifice ring plate 230 is within the active core 204, an axial axis of the orifice ring plate 230 aligns with the longitudinal axis 244 of the active core 204 so that the core 204 and the plate 230 are coaxial. The top end 246 and the bottom end 248 extend is a direction along the longitudinal axis 244 such that the orifice ring plate 230 is substantially parallel to the longitudinal axis 244 of the active core 204. The top end 246 and the bottom end 248 define a height $H_1$ of the orifice ring plate 230. The orifice ring plate 230 has a plurality of first apertures 250 that are configured to allow a flow of fuel salt through the plate, and the greater number of apertures 250 the more fuel salt is allowed to flow through the plate. In the example, the first apertures 250 are circumferentially spaced around the orifice ring plate 230 and extend in a radial direction relative to the longitudinal axis 244. In an aspect, the apertures 250 are spaced approximately every 4°. The first apertures 250 are substantially circular in shape, however, it is appreciated that the shape of the apertures can have any other shape (e.g., oval, rectangular, etc.) that enables the orifice ring plate 230 to function as described herein.

In the example, the orifice ring plate 230 is downstream of the inlet channel 232 and at least partially covers the inlet channel 232 with respect to the active core 204. In an aspect, the bottom end 248 of the orifice ring plate 230 is directly adjacent the lower reflector 220 (shown in FIG. 2). In other aspects, the bottom end 248 of the orifice ring plate 230 may be offset and raised above the lower reflector 220 so that a gap is formed between the bottom end 248 and the lower reflector 220. Additionally, the orifice ring plate 230 has an inner radial surface 252 and an opposite outer radial surface 254. The outer radial surface 254 faces the inlet channel 232. The inner radial surface 252 is axially aligned with an inner circumferential perimeter 256 of the active core 204 formed by the reflectors. That is, the inner radial surface 252 has a diameter 258 that is approximately equal to an inner diameter 260 of the core 204. The inner diameter 260 of the core 204 is formed at least partially by the side reflectors 222 (shown in FIG. 2). Because the orifice ring plate 230 has a thickness Ti, the diameter of the outer radial surface 254 is greater than the inner diameter 260 of the core 204.

The inlet channels 232 and the outlet channels 236 extend in a radial direction relative to the longitudinal axis 244 of the active core 204. The inlet channels 232, however, are radially offset 262 from the circumferential perimeter 256 of the active core 204. As such, an upstream gap 264 in the radial direction is formed between the inlet channel 232 and the outer radial surface 254 of the orifice ring plate 230. The gap 264 enables each of the inlet channels 232 to be in flow communication with each other upstream of the orifice ring plate 230 and increase flow distribution around the perimeter 256 of the active core 204. By allowing the fuel salt flow from each of the inlet channels 232 to be balanced prior to entering the active core 204 (because flow velocities in each inlet channel may be different), flow imbalance within the core 204 is reduced or prevented.

The inlet channel 232 has a perimeter 266 at the active core 204. The perimeter 266 has a height $H_2$ and a width $W_2$. In the example, the height $H_1$ of the orifice ring plate 230 is approximately equal to the height $H_2$ of the inlet channel 232. This size and shape of the orifice ring plate 230 would generally completely cover the inlet channel 232, however, an intersection edge 268 of the inlet channel 232 and the active core 204 is rounded and has a radius 270. In the example, the side reflectors 222 defines the boundary of the flow loop 208 between the inlet channel 232 and the active core 204. As such, the side reflectors 222 have a lower inside corner 272 (shown in FIG. 2) that has a rounded surface and which corresponds to the radius 270. In an aspect, an aspect ratio (e.g., the ratio of width to height) of the inlet channel 232 at least partially defines the radius 270. For example, for inlet channel geometries with an aspect ratio about 1, the radius 270 may be about one-third of the height $H_2$ of the inlet channel 232. In the example illustrated in FIG. 4, the inlet channel 232 is relatively narrow (e.g., the width $W_2$ greater than the height $H_2$), and as such, the radius 270 is greater than one-third of the height $H_2$ so that the rounding radius of edge 268 is increased.

In operation and during flow of fuel salt within the flow loop 208, the position of the orifice ring plate 230 enables the fuel salt exiting the inlet channel 232 to flow above the plate 230, through the plate 230 via the first apertures 250, and below the plate 230 in order to enter the active core 204. The first apertures 250 are offset from the top end 246 of the orifice ring plate 230 such that a solid portion 274 is formed. The solid portion 274 induces at least a portion of the fuel salt to flow above the orifice ring plate 230, and the larger the solid portion 274, the more flow is directed above the plate 230. Additionally, the bottom end 248 has a plurality of second apertures 276 that are partially defined in the plate 230 and that are configured to allow fuel salt to flow under the bottom of the plate. In the example, the second apertures 276 are circumferentially spaced around the orifice ring plate 230 and extend in a radial direction relative to the longitudinal axis 244. The second apertures 276 are substantially semi-circular in shape, however, it is appreciated that the shape of the apertures can have any other shape (e.g., oval, rectangular, etc.) that enables the orifice ring plate 230 to function as described herein.

In the example, the first apertures 250 form a row of apertures with a centerline positioned along the height $H_1$ of the plate 230. The first apertures 250 are similarly sized and shaped and are equally circumferentially spaced. The second apertures 276 also form a row of apertures with a centerline positioned along the height $H_1$ of the plate 230 but offset from the row of first apertures 250 so that they do not axially overlap. The second apertures 276 are similarly sized and shaped and are equally circumferentially spaced. The row of first apertures 250 are circumferentially offset from the row of second apertures 276 so that the first apertures 250 are positioned between the second apertures 276 and vice-versa. In other examples, the apertures 250, 276 may have different sizes and/or shapes as required or desired. The apertures 250, 276 may also have different dimensions (e.g., diameter for a circular apertures) as needed in either the circumferential and/or axial directions of the orifice ring plate 230 so as to provide the desired flow distribution corrections for target conditions of interest.

Figure 6:
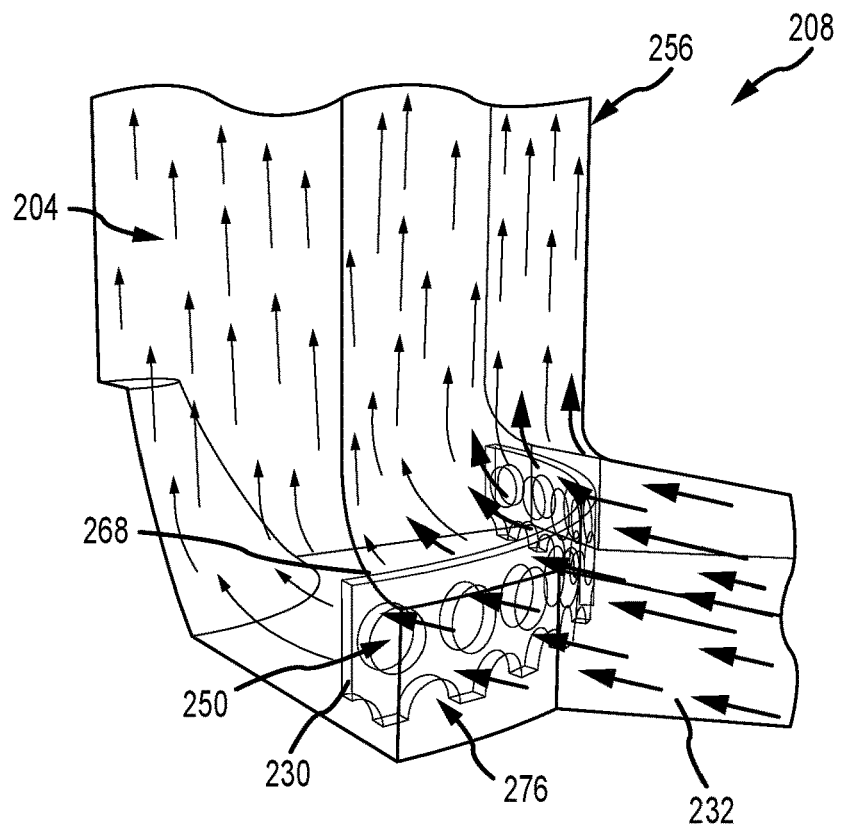
FIG. 6 is a fuel salt flow vector plot for the fuel salt flow loop shown in FIG. 4.
Figure 7:
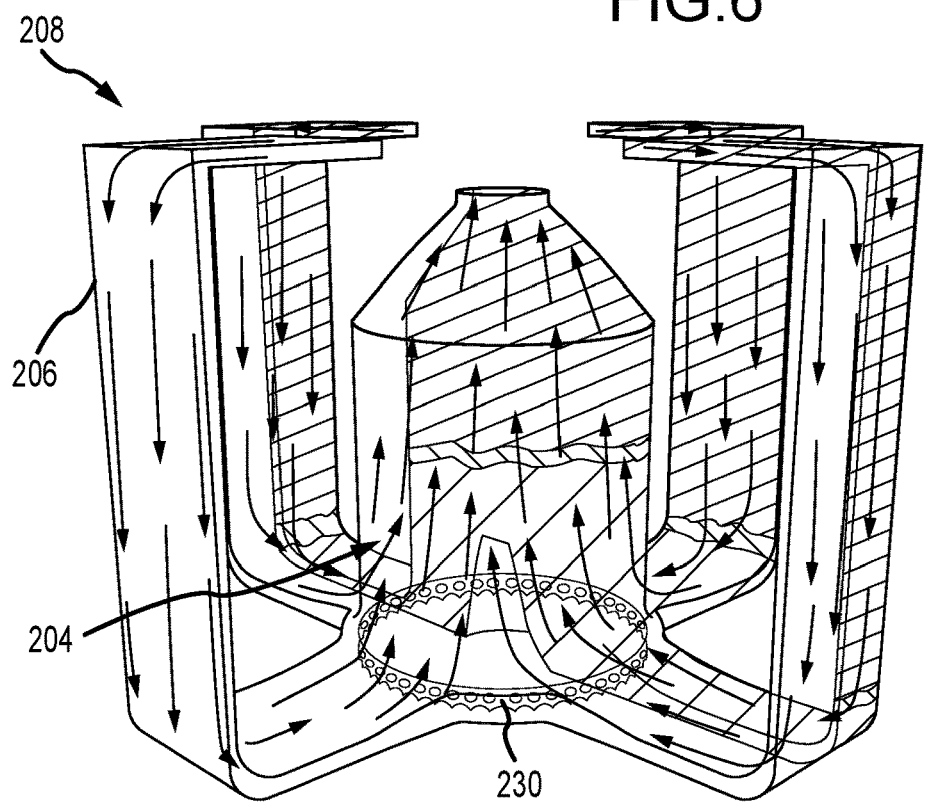
FIG. 7 is a fuel salt flow vector and temperature plot for the fuel salt flow loop shown in FIG. 3.

FIG. 6 is a fuel salt flow vector plot for the fuel salt flow loop 208 shown in FIG. 4. FIG. 7 is a fuel salt flow vector and temperature plot for the fuel salt flow loop 208 shown in FIG. 3. Referring concurrently to FIGS. 6 and 7, certain components are described above, and thus, are not necessarily described further. From fuel salt modeling, the orifice ring plate 230 enables fuel salt flow to be balanced and distributed when entering the active core 204 so as to increase reactor performance. For example, a portion of the flow is directed in an upwards direction from the inlet channel 232 and reduces or prevents flow recirculation along the inner perimeter 256 of the active core 204. A portion of the flow is channeled through the orifice ring plate 230 to distribute flow in the azimuthal direction. Additionally, a portion of the flow is channeled under the orifice ring plate 230 to reduce or prevent recirculation proximate the centerline of the active core 204.

Turning first to FIG. 6, the vector plot illustrates fuel salt flow velocity through the orifice ring plate 230. The orifice ring plate 230 enables fuel salt to pass through the plate 230 (e.g., via apertures 250) so as to provide flow distribution in the azimuthal direction, enables fuel salt to go over the plate 230 and up the reflector wall to reduce or prevent flow recirculation, and enable fuel salt to go below the plate 230 to reduce or prevent centerline recirculation and enable fuel salt drainage from the inlet channel 232. Generally, the largest flow velocity of the fuel salt is retained by going over the top of the orifice ring plate 230. The reactor modeled has a flow velocity of fuel salt that is considered to be low and is generally around 1 meter/second. Because of the low flow velocity, more flow is directed through the orifice ring plate 230 since flow recirculations are not very large.

Additionally, the fuel salt flow velocity upstream and downstream of the orifice ring plate 230 is substantially maintained. In the example, the pressure drop across the orifice ring plate 230 is less than or equal to approximately 10 kilopascal (kPa). In other examples, the pressure drop is less than or equal to approximately 25 kPa. Generally, pressure drop across the orifice ring plate 230 is between about 5-10% of the overall fuel salt flow loop pressure. By reducing the pressure drop across the orifice ring plate 230, flow velocity of the fuel salt within the flow loop 208 is improved and performance of the active core 204 is increased. Additionally, reducing the pressure drop across the orifice ring plate 230 increases the efficiency of the pump assembly 202 (shown in FIG. 2) that induces the flow of fuel salt. The orifice ring plate 230 as described herein enables a variety of parameters (e.g., height, size of apertures, aperture spacing, solid portion sizes, etc.) to be tuned so that the plate 230 can increase performance of the reactor.

Turning now to FIG. 7, the vector plot illustrates fuel salt flow velocity through the entire flow loop 208, and the orifice ring plate 230 enables the fuel salt to maintain its velocity throughout the loop 208 more effectively because flow recirculations are reduced or prevented. For example, if there is not even pressure distribution within the core and there is increased flow pressure in the center, recirculations are induced at the sides of the core. Conversely, with increased flow pressure on the sides, recirculations are induced at the center of the core. Additionally, temperature distribution of the fuel salt within the active core 204 improves because flow recirculations are reduced or prevented. Accordingly, the orifice ring plate 230 improves performance of a molten fuel reactor.

Figure 8:
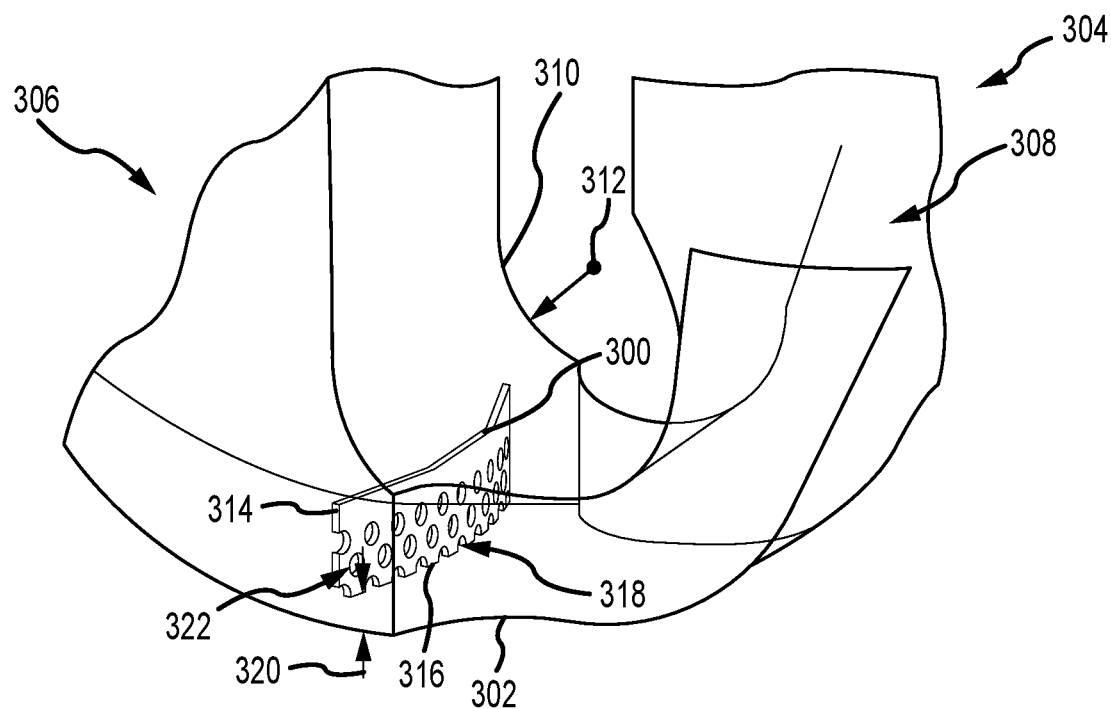
FIG. 8 is a partial perspective view of another orifice ring plate and an inlet channel of another fuel salt flow loop.

FIG. 8 is a partial perspective view of another orifice ring plate 300 and an inlet channel 302 of another fuel salt flow loop 304. In this example, the flow loop 304 includes a reactor core 306 that is substantially a right-circular cylinder shape with the inlet channel 302 proximate the bottom. The inlet channel 302 is connected to a channel 308 that includes a heat exchanger (not shown) and is on the opposite side of a reflector (now shown) from the reactor core 306. The flow loop 304 in this example has eight inlet channels 302 that channel fuel salt into the reactor core 306. The inlet channel 302 has an aspect ratio (e.g., width to height ratio) that is not as severe at the inlet channel described above in reference to FIGS. 2-7, however, fuel salt flow velocities are significantly higher (e.g., around 7 meters/second). As such, an edge 310 between the inlet channel 302 and the reactor core 306 has a radius 312 that is about one-third of the height of the inlet channel 302.

In this example, the orifice ring plate 300 has a top end 314 that is formed with a solid portion and a bottom end 316 that has a plurality of second apertures 318 that are partially defined within the plate 300. In this example, however, the bottom end 316 of the plate 300 is raised above the lower reflector (not shown) by a longitudinal offset 320. This offset 320 allows more fuel salt to pass under the orifice ring plate 300 to avoid centerline recirculation and support drainage in higher flow velocities. Additionally, a plurality of first apertures 322 are fully defined within the plate 300. In this example, the first apertures 322 are formed in two rows that are circumferentially offset from one another. By having two rows of apertures 322 more fuel salt can pass through the plate 300 to provide flow distribution in the reactor core 306.

In an aspect, the configuration of the orifice ring plate 300 may be as follows. An original height of the plate 300 is set to be approximately equal to the height of the inlet channel 302 and four rows of apertures are sized within the plate 300.

As such, the diameter of the apertures may be at least partially based on the height of the inlet channel 302. Then the top row of apertures are removed to form the solid portion at the top end 314. In this example, because of the larger flow rate of the fuel salt, the solid portion is larger than the examples described above so that more flow is directed up the sides of the reactor core 304 since recirculations are larger. At the bottom end 316, the plate forming half of the apertures 318 is cut off, and this forms the offset 320 with a final height of the plate 300 being less than the height of the inlet channel 302. By increasing the amount of flow below the orifice ring plate 300, flow recirculation from the plate 300 itself is reduced or prevented for high flow velocities. The plurality of first apertures 322 in the middle can be two rows of uniformly sized holes. In other aspects, the orifice ring plate 300 may be formed with multiple rows of apertures with decreasing size going up the rows from the bottom (e.g., largest apertures in the bottom row and smallest apertures in the top row), and in some examples, without including a raised gap at the bottom and an aperture free row at top.

Figure 9:
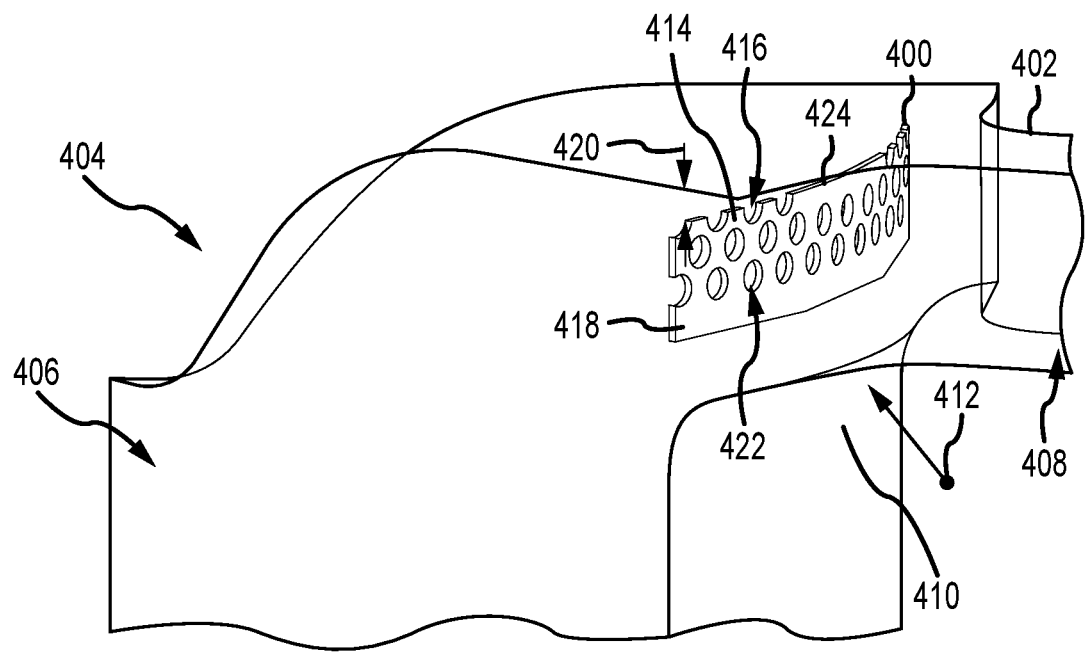
FIG. 9 is a partial perspective view of another orifice ring plate and an inlet channel of another fuel salt flow loop.

FIG. 9 is a partial perspective view of another orifice ring plate 400 and an inlet channel 402 of another fuel salt flow loop 404. In this example, the flow loop 404 includes a reactor core 406 that is substantially a right-circular cylinder shape with the inlet channel 402 proximate the top. As such, in this example the flow loop 404 is reversed when compared to the examples described above with the fuel salt being pumped downward through the reactor core 406, and the fuel salt exits the reactor core 406 at the bottom and enters from the top. Thus, the inlet channel 402 is disposed adjacent an upper reflector (not shown). In this example, by reversing the flow direction, the pump is disposed on the cold side of the flow loop 404 which increases pump efficiencies.

Similar to the example described above in FIG. 8, the inlet channel 402 is connected to a channel 408 that includes a heat exchanger (not shown) and is on the opposite side of a reflector (now shown) from the reactor core 406. The flow loop 404 has eight inlet channels 402 that channel fuel salt into the reactor core 406. The inlet channel 402 has an aspect ratio (e.g., width to height ratio) that is not as severe at the inlet channel described above in reference to FIGS. 2-7, however, fuel salt flow velocities are significantly higher (e.g., around 7 meters/second). As such, an edge 410 between the inlet channel 402 and the reactor core 406 has a radius 412 that is about one-third of the height of the inlet channel 402.

In this example, because the flow loop 404 is reversed, the orifice ring plate 400 has a top end 414 that has a plurality of second apertures 416 that are partially defined within the plate 400 and a bottom end 418 that is formed with a solid portion. The top end 414 of the plate 400 is lowered below the upper reflector (not shown) by a longitudinal offset 420. Additionally, a plurality of first apertures 422 are fully defined within the plate 400. In this example, the first apertures 422 are formed in two rows that are circumferentially offset from one another. In this flow loop 404, the orifice ring plate 400 increases fuel salt flow distribution in the reactor core 406 and reduces and/or prevents flow recirculation as described above. Additionally, the orifice ring plate 400 counteracts the buoyant forces from fuel salt heating in an upwards directions. For example, the size and spacing of the apertures 416, 422 can be different than the example described in FIG. 8. Additionally, a partial solid portion 424 may be formed on the top end 414 of the plate 400 between apertures 416. In some examples, the partial solid portion 424 may extend all the way to the upper reflector. In an aspect, the configuration of the orifice ring plate 400 with relating the sizes of the apertures 416, 422 to the height of the inlet channel 402 may be similar to the plate 300 described above in reference to FIG. 8.

Figure 10:
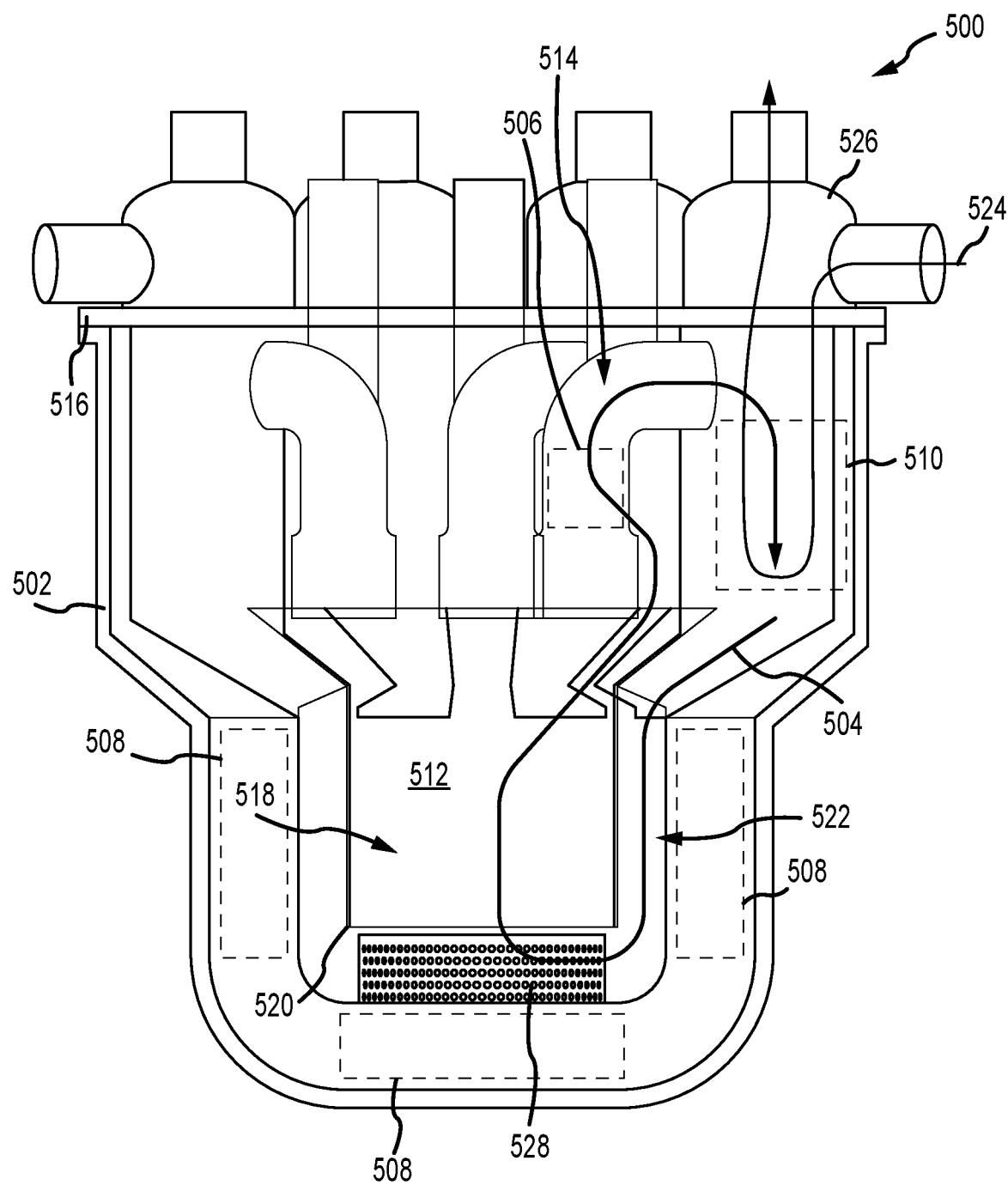
FIG. 10 is an elevation view of another possible physical implementation of a reactor core system.

FIG. 10 is an elevation view of another possible physical implementation of a reactor core system 500. In this example, the reactor core system 500 can be a demonstration reactor that is a nuclear reactor designed to allow for efficient testing and assessment of the reactor's design and technology or a commercial reactor as required or desired. Both demonstration and commercial reactors generate heat, however, the dissipation of the heat generated during operation includes the generation of useable power in commercial reactors, while the generation of useable power may or may not occur in demonstration reactors.

The reactor core system 500 is a pool-type reactor having an enclosed vessel 502 with no bottom penetrations that contains reactor fuel salt 504, a fuel pump assembly 506, reflectors 508, heat exchangers 510, and control elements (not shown). The molten fuel salt 504 fills in all the space within the vessel 502 that is not taken up by components (e.g., reflectors 508, pump assembly 506, and heat exchangers 510), shielding, or fuel displacement elements. This forms a central 'active' critical core region 512 as well as fuel channels 514 connecting the active core 512 with the pump assembly 506 and heat exchangers 510. Reactor control elements (not shown) enter through a vessel head 516 and are positioned within the radial reflector region surrounding the active core 512. Multiple fuel circuits operate in parallel to circulate the fuel salt 504, and in the event of a loss of forced flow, the reactor core system 500 is capable of retaining the fuel salt safely in the vessel 502 and removing decay heat via robust natural circulation.

The critical, 'active core' region 512 of the system 500 includes an open central, cylindrical chamber 518 defined by an annular draft tube 520 and a downcomer duct 522 defined outside of the draft tube 520 (e.g., between the draft tube 520 and the reflectors 508). In operation, the pump assembly 506 drives the fuel salt 504 upwardly out of the active core 512 and through the heat exchanger 510. A coolant flow 524 is channeled through an exchanger head 526 to extract heat from the active core 512. The fuel salt 504 exits from the bottom of the heat exchanger 510 and into the annular downcomer duct 522 between the draft tube 520 and the reflectors 508 re-entering the active core 512. The fuel salt 504 transitions around the bottom of the submerged draft tube 520 that separates the upward flowing fuel salt 504 within the chamber 518 from the downward flowing fuel salt 504 within the downcomer duct 522.

Additionally, an orifice ring plate 528 is disposed within the active core 512 and proximate the transition of the fuel salt 504 between the downcomer duct 522 and the chamber 518 of the active core 512. The orifice ring plate 528 is configured to condition the flow of fuel salt 504 moving around the bottom of the submerged draft tube 520 so as to reduce or eliminate fuel salt flow recirculation inside the lower active core region. The orifice ring plate 528 is described in further detail below.

Figure 11:
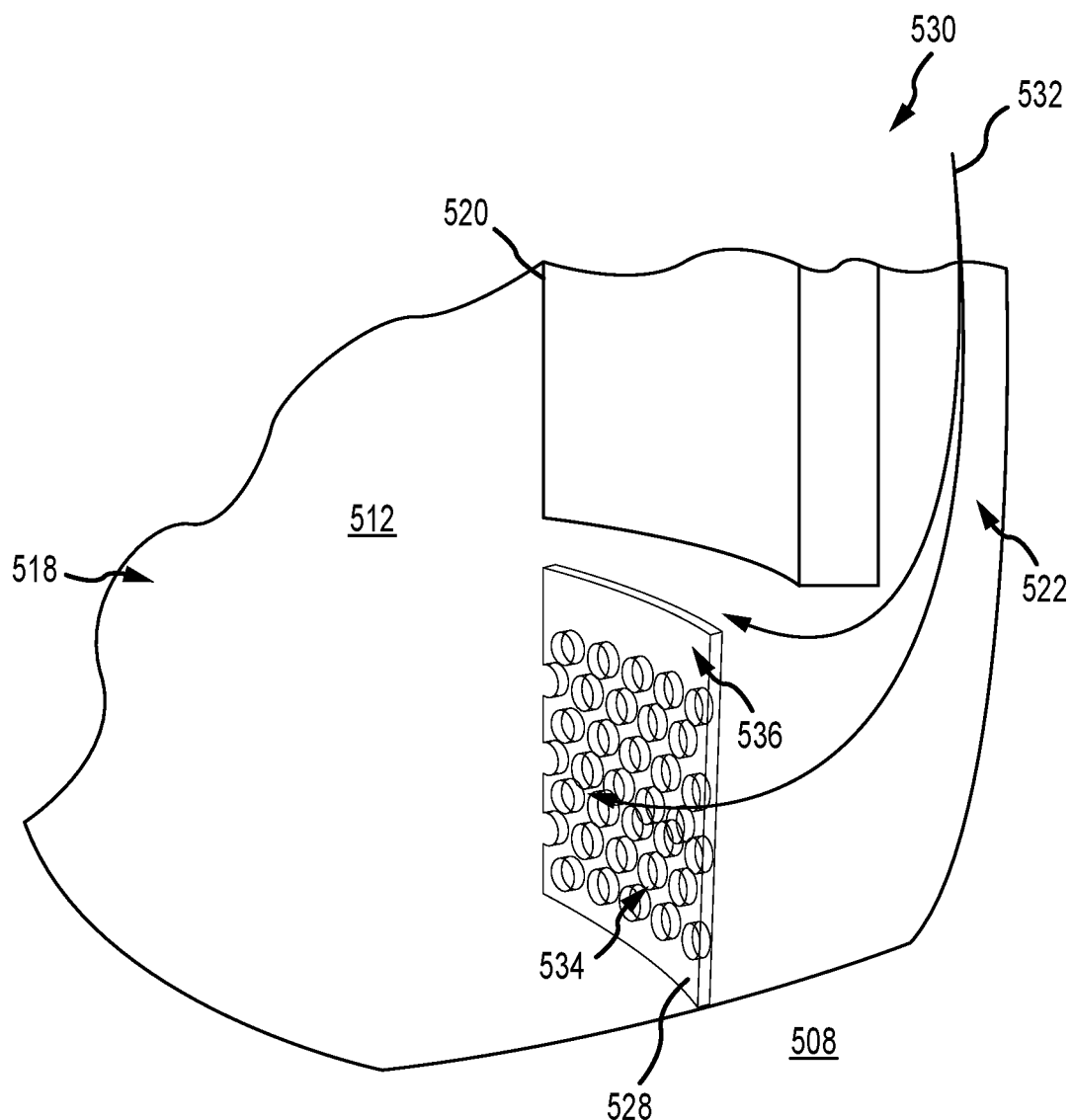
FIG. 11 is a partial perspective view of a fuel salt flow loop of the reactor core system shown in FIG. 10.

FIG. 11 is a partial perspective view of a fuel salt flow loop 530 of the reactor core system 500 (shown in FIG. 10). The flow loop 530 is full of fuel salt and the flow direction is illustrated by arrows 532. The flow loop 530 is at least partially defined by the draft tube 520 and the reflectors 508. In the active core 512 the fuel salt turns approximately 180° from the downcomer duct 522 to the chamber 518. The orifice ring plate 528 is disposed within the active core 512 proximate the bottom end of the draft tube 520. The orifice ring plate 528 has a plurality of apertures 534 arranged in rows configured to allow a flow of fuel salt through the plate and a top solid portion 536 that directs at least a portion of the fuel salt flow above the orifice ring plate 528. Additionally, the orifice ring plate 528 has a diameter that is less than a diameter of the draft tube 520 so that the orifice ring plate 528 is inwardly offset from the draft tube 520. A height of the orifice ring plate 528 is about equal to or less than the height of the bottom end of the draft tube 520 above the bottom reflector 508. The orifice ring plate 528 is coupled to and extends from the bottom of the core. In some example, a portion of the top of the orifice ring plate 528 may be supported by the draft tube 520 as required or desired.

The orifice ring plate 528 enables the fuel salt flow 532 to be balance and distributed when entering the chamber 518 so as to increase reactor performance. For example, a portion of the flow is directed in an upwards direction along the inner surface of the draft tube 520 and reduces or prevents flow recirculation along the draft tube 520. A portion of the flow is channeled through the orifice ring plate 528 to distribute flow in the azimuthal direction. Additionally, a portion of the flow is channeled under the orifice ring plate 528 to reduce or prevent recirculation proximate the centerline of the active core 512. The spacing, sizing, and configuration of the apertures 534 and top solid portion 536 can be adjusted as described herein to balance and distribute the fuel salt flow.

In general, increased fuel salt flow balance and distribution within the reactor core and the reduction and/or prevention of flow recirculation is enabled by the orifice ring plate designs as described above. It should be appreciated that modifying one or more design parameters of the orifice ring plate, for example, but not limited to, inner ring diameter, ring thickness, aperture diameter, aperture angular spacing, etc. can be done to tailor the orifice ring plate to specific reactor core designs and fuel salt flow velocities. For example, the aperture size and spacing can be adjusted to tailor the amount of flow directed along the reflector wall. The size of the solid portion can also change the amount of flow directed along the reflector wall. The partial aperture size and spacing and/or the bottom offset can change the amount of flow directed underneath the plate and towards the centerline of the core. Aperture size and spacing also changes pressure drop and flow distribution within the core. For example, large diameter apertures enable more flow through the plate than smaller diameter apertures. Aperture sizes can be modified by location relative to the inlet channel (e.g., smaller diameters closer to the inlet channel and larger diameters farther away), and/or modified by location on the plate (e.g., smaller diameter at the bottom and larger diameters at the top). The thickness of the orifice ring plate can change the amount of pressure drop across the plate.

Notwithstanding the appended claims, and in addition to the examples described above, further examples are disclosed in the following numbered clauses:

1. A molten fuel reactor comprising:
   a reactor core defined at least partially by an upper reflector, a lower reflector, and at least one side reflector, wherein the reactor core is substantially a right-circular cylinder shape, and wherein the reactor core has a longitudinal axis and an inner diameter;
   at least one inlet configured to channel fuel salt into the reactor core;
   at least one outlet configured to channel fuel salt out of the reactor core, wherein the at least one inlet and the at least one outlet at least partially define a flow loop of fuel salt with respect to the reactor core; and
   an orifice ring plate disposed within the reactor core and proximate the at least one inlet, wherein the orifice ring plate is configured to condition a flow of fuel salt entering the reactor core from the at least one inlet, wherein the orifice ring plate extends circumferentially about the longitudinal axis and has a height defined in a direction along the longitudinal axis, and wherein the orifice ring plate includes a plurality of apertures configured to allow the flow of fuel salt therethrough.

2. The molten fuel reactor of clause 1, wherein the orifice ring plate has an inner surface that is aligned with the inner diameter of the reactor core.

3. The molten fuel reactor as in any preceding clause, wherein the at least one inlet includes a first inlet and a second inlet, wherein a gap is formed upstream of the orifice ring plate such that the first inlet and the second inlet are in flow communication.

4. The molten fuel reactor as in any preceding clause, wherein the at least one inlet has a height defined in the longitudinal axis direction, and wherein the height of the orifice ring plate is approximately equal to the height of the at least one inlet.

5. The molten fuel reactor as in any preceding clause, wherein an edge is defined between the reactor core and the at least one inlet, and wherein the edge is at least partially rounded.

6. The molten fuel reactor of clause 5, wherein the at least one inlet has a height defined in the longitudinal axis direction, and wherein a radius of the edge is about one-third of the height of the at least one inlet.

7. The molten fuel reactor of as in any preceding clause, wherein the orifice ring plate includes a top end and a bottom end, wherein the top end has a solid portion such that the plurality of apertures are offset from the top end of the orifice ring plate.

8. The molten fuel reactor as in any preceding clause, wherein the orifice ring plate includes a top end and a bottom end, wherein one or more of the plurality of apertures are partially defined in the bottom end.

9. The molten fuel reactor of clause 8, wherein the bottom end is offset from the lower reflector.

10. The molten fuel reactor as in any preceding clause, wherein the at least one inlet is adjacent the upper reflector.

11. A molten fuel reactor comprising:
   an upper reflector;
   a lower reflector;
   at least one radial reflector extending between the upper reflector and the lower reflector;
   a reactor core defined at least partially by the upper reflector, the lower reflector, and the at least one radial reflector, wherein the reactor core defines a longitudinal axis substantially parallel to the at least one radial reflector;
   a plurality of radial inlets adjacent the lower reflector and circumferentially spaced about the longitudinal axis;
   a plurality of radial outlets adjacent the upper reflector and circumferentially spaced about the longitudinal axis, wherein a flow loop of fuel salt is defined through the reactor core with respect to the plurality of radial inlets and the plurality of radial outlets; and
   an orifice ring plate disposed within the reactor core and proximate the plurality of radial inlets, wherein the orifice ring plate includes a plurality of radial apertures, and wherein a flow of fuel salt exiting the plurality of radial inlets flows above the orifice ring plate, through the plurality of radial apertures, and below the orifice ring plate to enter the reactor core.

12. The molten fuel reactor of clause 11, wherein the orifice ring plate has an outer diameter that is greater than an inner diameter of the reactor core.

13. The molten fuel reactor as in any of clauses 11 or 12, wherein a radial gap is formed between the orifice ring plate and the plurality of radial inlets.

14. The molten fuel reactor as in any of clauses 11-13, wherein the at least one radial reflector includes a lower corner that defines a boundary of the flow loop between the plurality of radial inlets and the reactor core, and wherein the lower corner has a curved surface.

15. The molten fuel reactor as in any of clauses 11-14, wherein a height of the orifice ring plate is approximately equal to a height of the plurality of radial inlets.

16. The molten fuel reactor as in any of clauses 11-15, wherein a pressure drop of the flow of fuel salt across the orifice ring plate is between about 5-10%.

17. An orifice ring plate for a molten fuel reactor, the molten fuel reactor having a reactor core that is substantially a right-circular cylinder shape having a longitudinal axis, wherein the orifice ring plate comprises:

a circular plate body circumferentially extending around an axial axis, wherein the circular plate body includes a first end and an opposite second end extending in a direction that is substantially parallel to the axial axis, and wherein the circular plate body is configured to be disposed within the reactor core and the axial axis aligned with the longitudinal axis; and a plurality of radial apertures defined in the circular plate body and circumferentially spaced around the axial axis.

18. The orifice ring plate of clause 17, wherein the plurality of radial apertures are offset from the first end of the circular plate body.

19. The orifice ring plate of clause 18, wherein the plurality of radial apertures include at least one first row of radial apertures that are completely defined within the circular plate body and a second row of radial apertures that are partially defined within the circular plate body, and wherein the second row of radial apertures are disposed at the second end of the circular plate body.

20. The orifice ring plate of clause 19, wherein the at least one first row of radial apertures and the second row of radial apertures are circumferentially offset from one another.

It is to be understood that this disclosure is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. It must be noted that, as used in this specification, the singular forms "a," "an," and "the" include plural referents unless the context clearly dictates otherwise.

It will be clear that the systems and methods described herein are well adapted to attain the ends and advantages mentioned as well as those inherent therein. Those skilled in the art will recognize that the methods and systems within this specification may be implemented in many manners and as such is not to be limited by the foregoing exemplified examples and examples. In this regard, any number of the features of the different examples described herein may be combined into one single example and alternate examples having fewer than or more than all of the features herein described are possible.

While various examples have been described for purposes of this disclosure, various changes and modifications may be made which are well within the scope contemplated by the present disclosure. Numerous other changes may be made which will readily suggest themselves to those skilled in the art and which are encompassed in the spirit of the disclosure.

What is claimed is:

1. A molten fuel reactor comprising:

a reactor core defined at least partially by an upper reflector, a lower reflector, and at least one side reflector, wherein the reactor core is substantially a right-circular cylinder shape, and wherein the reactor core has a longitudinal axis and an inner diameter;

at least one inlet configured to channel fuel salt into the reactor core;

at least one outlet configured to channel fuel salt out of the reactor core, wherein the at least one inlet and the at least one outlet at least partially define a flow loop of fuel salt with respect to the reactor core; and an orifice ring plate disposed within the reactor core and proximate the at least one inlet, wherein the orifice ring plate is configured to condition a flow of fuel salt entering the reactor core from the at least one inlet, wherein the orifice ring plate extends circumferentially about the longitudinal axis and has a height defined in a direction along the longitudinal axis, and wherein the orifice ring plate includes a plurality of apertures configured to allow the flow of fuel salt therethrough.

2. The molten fuel reactor of claim 1, wherein the orifice ring plate has an inner surface that is aligned with the inner diameter of the reactor core.

3. The molten fuel reactor of claim 1, wherein the at least one inlet includes a first inlet and a second inlet, wherein a gap is formed upstream of the orifice ring plate such that the first inlet and the second inlet are in flow communication.

4. The molten fuel reactor of claim 1, wherein the at least one inlet has a height defined in the longitudinal axis direction, and wherein the height of the orifice ring plate is approximately equal to the height of the at least one inlet.

5. The molten fuel reactor of claim 1, wherein the at least one side reflector has an inside corner that at least partially separates the reactor core and the at least one inlet, and wherein the inside corner is at least partially rounded.

6. The molten fuel reactor of claim 5, wherein the at least one inlet has a height defined in the longitudinal axis direction, and wherein a radius of the inside corner is greater than or equal to one-third of the height of the at least one inlet.

7. The molten fuel reactor of claim 1, wherein the orifice ring plate includes a top end and a bottom end, wherein the top end has a solid portion such that the plurality of apertures are offset from the top end of the orifice ring plate.

8. The molten fuel reactor of claim 1, wherein the orifice ring plate includes a top end and a bottom end, wherein one or more of the plurality of apertures are partially defined in the bottom end.

9. The molten fuel reactor of claim 8, wherein the bottom end is offset from the lower reflector.

10. The molten fuel reactor of claim 1, wherein the at least one inlet is adjacent the upper reflector.

11. A molten fuel reactor comprising:

an upper reflector;

a lower reflector;

at least one radial reflector extending between the upper reflector and the lower reflector;

a reactor core defined at least partially by the upper reflector, the lower reflector, and the at least one radial reflector, wherein the reactor core defines a longitudinal axis substantially parallel to the at least one radial reflector;

a plurality of radial inlets adjacent the lower reflector and circumferentially spaced about the longitudinal axis;

a plurality of radial outlets adjacent the upper reflector and circumferentially spaced about the longitudinal axis, wherein a flow loop of fuel salt is defined through the reactor core with respect to the plurality of radial inlets and the plurality of radial outlets; and a circumferential orifice ring plate disposed within the reactor core and proximate the plurality of radial inlets, wherein the orifice ring plate includes a plurality of radial apertures, and wherein a flow of fuel salt exiting the plurality of radial inlets flows above the orifice ring plate, through the plurality of radial apertures, and below the orifice ring plate to enter the reactor core.

12. The molten fuel reactor of claim 11, wherein the orifice ring plate has an outer diameter that is greater than an inner diameter of the reactor core.

13. The molten fuel reactor of claim 11, wherein a radial gap is formed between the orifice ring plate and the plurality of radial inlets.

14. The molten fuel reactor of claim 11, wherein the at least one radial reflector includes a lower corner that separates the plurality of radial inlets and the reactor core, and wherein the lower corner has a curved surface.

15. The molten fuel reactor of claim 11, wherein a height of the orifice ring plate is approximately equal to a height of the plurality of radial inlets.

16. The molten fuel reactor of claim 11, wherein a pressure drop of the flow of fuel salt across the orifice ring plate is between about 5-10%.

17. A molten fuel reactor comprising:

a reactor core defined at least partially by an upper reflector, a lower reflector, and at least one side reflector, wherein the reactor core is substantially a right-circular cylinder shape, and wherein the reactor core has a longitudinal axis and an inner diameter defined by the at least one side reflector;

at least one inlet configured to channel fuel salt into the reactor core;

at least one outlet configured to channel fuel salt out of the reactor core, wherein the at least one inlet and the at least one outlet at least partially define a flow loop of fuel salt with respect to the reactor core; and an orifice ring plate disposed within the reactor core and proximate the at least one inlet, wherein the orifice ring plate is configured to condition a flow of fuel salt entering the reactor core from the at least one inlet, wherein the orifice ring plate extends circumferentially about the longitudinal axis and has both a inside surface diameter and a height that is defined in a direction along the longitudinal axis, the inside surface diameter being equal to the inner diameter of the reactor core, and wherein the orifice ring plate includes a plurality of apertures configured to allow the flow of fuel salt therethrough.

* * * * *